US012752517B2

(12) United States Patent
Garnier et al.

(10) Patent No.: US 12,752,517 B2
(45) Date of Patent: Oct. 6, 2026

(54) OVERT SECURITY FEATURES

(71) Applicant: SICPA HOLDING SA, Prilly (CH)

(72) Inventors: Christophe Garnier, Reignier (FR); Frederika Kristina De Jaegere, Dommartin (CH); Cindy Mani, Echallens (CH); Andrea Callegari, Ecublens (CH); Lucien Vuilleumier, Begnins (CH)

(73) Assignee: SICPA HOLDING SA, Prilly (CH)

( * ) Notice: Subject to any disclaimer, the term of this patent is extended or adjusted under 35 U.S.C. 154(b) by 162 days.

(21) Appl. No.: 18/841,933

(22) PCT Filed: Feb. 22, 2023

(86) PCT No.: PCT/EP2023/054389
§ 371 (c)(1),
(2) Date: Aug. 27, 2024

(87) PCT Pub. No.: WO2023/165863
PCT Pub. Date: Sep. 7, 2023

(65) Prior Publication Data

US 2025/0303775 A1 Oct. 2, 2025

(30) Foreign Application Priority Data

Mar. 1, 2022 (EP) .................................... 22305229

(51) Int. Cl.
*B32B 19/04* (2006.01)
*B32B 3/10* (2006.01)
*B32B 19/02* (2006.01)

(52) U.S. Cl.
CPC .............. *B32B 19/045* (2013.01); *B32B 3/10* (2013.01); *B32B 19/02* (2013.01);
(Continued)

(58) Field of Classification Search
CPC ......... B32B 19/045; B32B 3/10; B32B 19/02; B32B 2250/03; B32B 2305/347; B32B 2307/208
(Continued)

(56) References Cited

U.S. PATENT DOCUMENTS

| | | | |
|---|---|---|---|
| 6,423,246 | B1 | 7/2002 | Kasch et al. |
| 6,589,445 | B2 | 7/2003 | Sugiyama et al. |

(Continued)

FOREIGN PATENT DOCUMENTS

| | | |
|---|---|---|
| EP | 0847432 | 6/2001 |
| EP | 2965920 | 1/2006 |

(Continued)

OTHER PUBLICATIONS

WO 2009/033601 A1 Machine Translation (Year: 2009).*
(Continued)

*Primary Examiner* — Betelhem Shewareged
(74) *Attorney, Agent, or Firm* — Muncy, Geissler, Olds & Lowe, P.C.

(57) ABSTRACT

The present invention relates to the field of methods for producing eye-catching overt security features exhibiting colorshifting properties as anti-counterfeit means on security documents or security articles as well as decorative purposes. In particular, the overt security feature exhibits comprises a) a substrate (x10), a color constant layer (x20) comprising magnetically oriented platelet-shaped magnetic or magnetizable pigment particles and an optically variable layer (x30) comprising a cholesteric liquid crystal polymer (CLCP) reflecting light in the visible spectrum range, wherein the platelet-shaped magnetic or magnetizable pigment particles of the color constant layer (x20) have substantially a same elevation angle α.

20 Claims, 4 Drawing Sheets

(52) U.S. Cl.
CPC ..... *B32B 2250/03* (2013.01); *B32B 2305/347* (2013.01); *B32B 2307/208* (2013.01)

(58) Field of Classification Search
USPC ........................................................ 428/195.1
See application file for complete search history.

(56) References Cited

U.S. PATENT DOCUMENTS

| | | | | |
|---|---|---|---|---|
| 7,047,883 | B2 | 5/2006 | Raksha et al. | |
| 2007/0224341 | A1 | 9/2007 | Kuntz et al. | |
| 2008/0171144 | A1* | 7/2008 | Raksha | B42D 25/00 428/29 |
| 2025/0303775 | A1* | 10/2025 | Garnier | B42D 25/369 |

FOREIGN PATENT DOCUMENTS

| | | |
|---|---|---|
| EP | 1854852 | 11/2007 |
| EP | 2157141 | 2/2010 |
| KR | 1020160083578 | 7/2016 |
| WO | 9322397 | 11/1993 |
| WO | 9522586 | 8/1995 |
| WO | 2009033601 | 3/2009 |
| WO | 2015055504 | 4/2015 |
| WO | 2015067683 | 5/2015 |
| WO | 2016083259 | 6/2016 |
| WO | 2018019594 | 2/2018 |
| WO | 2019038371 | 2/2019 |
| WO | 2021239607 | 12/2021 |
| WO | 2022049024 | 3/2022 |
| WO | 2022053351 | 3/2022 |
| WO | 2022258521 | 3/2022 |

OTHER PUBLICATIONS

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

International Search Report and Written Opinion issued with respect to application No. PCT/EP2023/054389.

* cited by examiner

Fig. 5A1
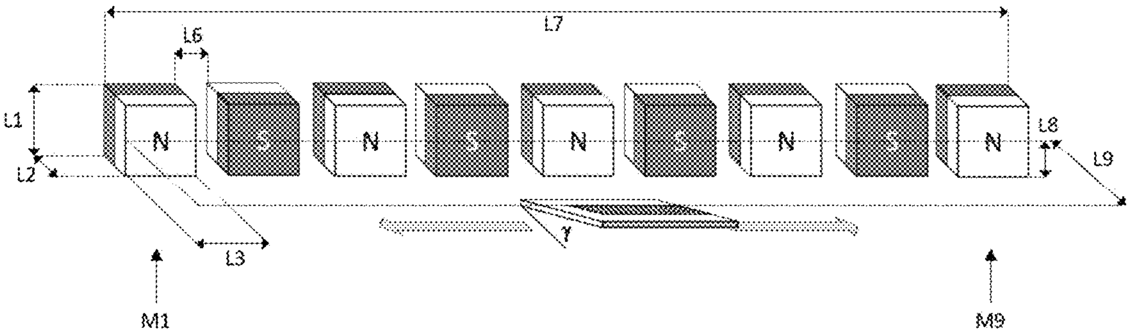
Fig. 5A2
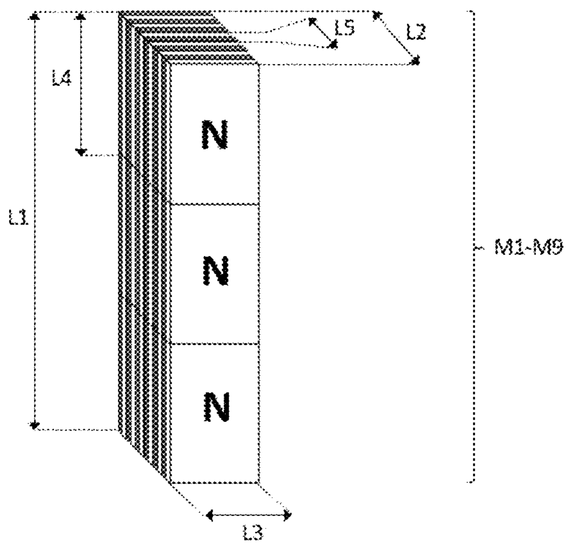

OVERT SECURITY FEATURES

FIELD OF THE INVENTION

The present invention relates to the field of overt security features on substrates, security documents, security articles and decorative articles. In particular, the present invention provides eye-catching overt security features exhibiting colorshifting properties as anti-counterfeit means on security documents or security articles as well as decorative purposes.

BACKGROUND OF THE INVENTION

With the constantly improving quality of color photocopies and printings, and in an attempt to protect security documents and articles such as banknotes, value documents or cards, transportation tickets or cards, tax banderols, and product labels that have no reproducible effects against counterfeiting, falsifying or illegal reproduction, it has been the conventional practice to incorporate various security elements in these documents and articles. Typical examples of security elements include security threads, windows, fibers, planchettes, foils, decals, holograms, watermarks, security inks comprising optically variable pigments, magnetic or magnetizable thin-film interference pigments, interference-coated particles, thermochromic pigments, photochromic pigments, luminescent, infrared-absorbing, ultraviolet-absorbing or magnetic compounds.

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their eye-catching effect and their easy recognition as a security feature, because most users, and particularly those having no prior knowledge of the security features of a document or article secured therewith, will only then actually perform a security check based on said security feature if they have actual knowledge of their existence and nature.

Colorshifting optically variable security features (also referred in the art as goniochromatic features) exhibit a color shift or color change, expressed by a change of the lightness and/or chroma and/or hue, upon variation of the angle of observation (also referred in the art as viewing angle) between a grazing angle and a face angle, and are used to protect security documents and article against counterfeiting and/or illegal reproduction by commonly available color scanning, printing and copying office equipment.

Typically, said security features are made from inks comprising flake-shaped multilayer interference pigments.

Other security features based on cholesteric liquid crystal materials have been developed. Materials having a liquid crystal structure with a chiral phase, also known as cholesteric liquid crystal materials, are known and used as optically variable security features. Cholesteric liquid crystal polymers show a molecular order in the form of a helical superstructure perpendicular to the longitudinal axes of its molecules. The helical superstructure provides for a periodic refractive index modulation throughout the liquid crystal material, which in turn results in a selective transmission/reflection of determined wavelengths of light (interference filter effect). Cholesteric liquid crystal polymers can be obtained by subjecting one or more crosslinkable substances (nematic compounds) with a chiral phase to alignment and orientation. The particular situation of the helical molecular arrangement leads to cholesteric liquid crystal materials exhibiting the property of reflecting a circularly polarized light component within a determined wavelength range, wherein said circularly polarized light may be left-handed or right-handed, depending on the sense of rotation of the molecular helices. The range of wavelengths reflected by a cholesteric liquid crystal polymer is determined by the geometry of its periodic refractive index modulation, i.e. the pitch of the molecular helices, as known to the skilled person. The pitch (i.e. the distance over which a full rotation of 360° of the helical arrangement is completed) can be tuned in particular by varying selectable factors including the temperature and solvents concentration, by changing the nature of the chiral component(s) and the ratio of nematic and chiral compounds. The pitch of the material can finally be frozen by a cross-linking (polymerization) reaction, such that the color of the resulting cholesteric liquid crystal polymer is no longer depending on external factors such as the temperature.

U.S. Pat. No. 6,423,246 discloses security features comprising optically variable pigments, wherein said pigments are prepared by comminuting cholesteric liquid crystal polymer films. The disclosed pigments exhibit a colorshift from a first color to a second color upon tilting said security features.

WO 2015/055504 A1 discloses optically variable security elements based on a single cured layer comprising a cholesteric liquid crystal polymer.

The range of colorshifts of cholesteric liquid crystal polymers available for security documents might be limited, and with the aim of increasing the color gamut of optically variable security features, it can be of advantage to modify the reflection characteristics and thereby increasing the range of available colors. As mentioned above, the reflected light from a cholesteric liquid crystal polymer depends on the pitch of its helical structure and is thereby dependent on the nature and the concentration of the chiral component(s). In particular, adding an appropriate quantity of the chiral component(s) to the precursor mixture results in a colorshift modification to shorter wavelengths. However, it is neither straightforward nor cost-effective to customize the cholesteric liquid crystal material during manufacture for each specific application and for each desired colorshift effect. Moreover, the fine-tuning of colorshift properties of cholesteric liquid crystal polymers is a delicate step often resulting in an important waste of time and/or material.

Therefore, a need remains for eye-catching multi-colored overt security features, in particular for highly demanding applications requiring high counterfeiting resilience, thus allowing an easy, direct and unambiguous authentication by the human eye without any external device or tool. Said overt security features are required to be prepared by methods which should be reliable, predictable in a controlled manner, easy to implement and able to work at a high production speed.

SUMMARY OF THE INVENTION

Accordingly, it is an object of the present invention to overcome the deficiencies of the prior art. This is achieved by the provision of an overt security feature comprising a) a substrate (x10) made of a material selected from the group consisting of transparent materials, light absorbing materials and combinations thereof, b) a color constant layer (x20) comprising magnetically oriented platelet-shaped magnetic or magnetizable pigment particles, and c) an optically variable layer (x30) comprising a cholesteric liquid crystal polymer (CLCP) reflecting light in the visible spectrum range and being on top of the color constant layer (x20) thus forming a first area made of a superposition of the optically variable layer (x30) and the color constant layer (x20), wherein the platelet-shaped magnetic or magnetizable pigment particles of the color constant layer (x20) have substantially the same elevation angle |α|, said elevation angle |α| having a value between about 10° and about 45° (10°≤angle |α|≤45°), preferably between about 15° and about 40° (15°≤angle |α|≤40°); and more preferably between about 15° and about 35° (15°≤angle |α|≤35°).

The elevation angles |α| provided herein consist of average values being obtained i) either with a conoscopic scatterometer as described hereafter, wherein said values were averaged over at least about 1000 platelet-shaped magnetic or magnetizable pigment particles or ii) with a microscope as described hereafter, wherein said values were averaged over at least 10, in particular between 10 and 20, platelet-shaped magnetic or magnetizable pigment particles.

The first area of the overt security feature exhibits at least three different colors upon observation through the optically variable layer (x30) at different viewing/observation angles, wherein one of said angles is a grazing angle (for example 10°, 20°, 30°, etc.) and another one is a face angle (about 90°), provided that the overt security feature has to be disposed on a light absorbing background when the substrate is transparent.

The color constant layer (x20) described herein comprises mono-axially oriented platelet-shaped magnetic or magnetizable pigment particles or comprise bi-axially oriented platelet-shaped magnetic or magnetizable pigment particles, wherein said particles exhibit a metallic color, more preferably a silver color.

The optically variable layer (x30) described herein is preferably obtained from a cholesteric liquid crystal polymer precursor composition comprising one or more nematic compounds, one or more chiral dopants, one or more photoinitiators and one or more solvents.

The overt security feature described herein is particularly suitable for protecting security documents, security articles and decorative articles against counterfeiting, fraud or illegal reproduction.

Also described herein are security documents, security articles and decorative articles comprising one or more of the overt security features described herein and methods for producing them as well as security documents, security articles and decorative articles obtained thereof. The methods for producing the overt security feature described herein comprise the steps of:

a) applying on the substrate (x10) surface a radiation curable coating composition comprising the platelet-shaped magnetic or magnetizable pigment particles, said radiation curable coating composition being in a first, liquid state so as to form a layer, b) exposing the layer obtained at step a) to magnetic field lines of a magnetic-field generating device, wherein said magnetic field lines form an elevation angle |γ| with the substrate (x10) surface, said angle |γ| having a value between about 10° and about 45° or between about 135° and about 170° so as to orient the platelet-shaped magnetic or magnetizable pigment particles;

c) partially simultaneously with or subsequently to the step b), a step of at least partially curing the layer with a curing unit so as to at least partially fix the position and orientation of the platelet-shaped magnetic or magnetizable pigment particles so that the platelet-shaped magnetic or magnetizable pigment particles have a same elevation angle |α| between about 10° and about 45° (10°≤angle |α|≤45°), preferably between about 15° and about 40° (15°≤angle |α|≤40°); and more preferably between about 15° and about 35° (15°≤angle |α|≤35°), so as to form the color constant layer (x20), d) applying either at least partially on the color constant layer (x20) and/or at least partially on the substrate (x10) surface a cholesteric liquid crystal polymer precursor composition, e) heating the layer obtained at step d), and f) hardening the layer obtained at step e) so as to obtain the optically variable layer (x30).

Also described herein are methods for manufacturing a security document, security article or a decorative article comprising a) providing a security document, security article or decorative article, and b) providing one or more overt security features described herein so that they are comprised on or by the security document, security article or decorative article.

BRIEF DESCRIPTION OF DRAWINGS

FIG. 5A1-A2 schematically illustrate a suitable magnetic-field-generating device for bi-axially orienting platelet-shaped magnetic or magnetizable pigment particles comprised in a layer on a substrate. The magnetic-field-generating device comprise nine magnet sub-assemblies (M1-M9) with alternating North-South magnetic directions and arranged in a row, wherein the substrate carrying the layer comprising the platelet-shaped magnetic or magnetizable pigment particles is tiled with an elevation angle γ and the particles are exposed to the magnetic field of the magnetic-field generating device.

DETAILED DESCRIPTION

Definitions

Figure 1A:
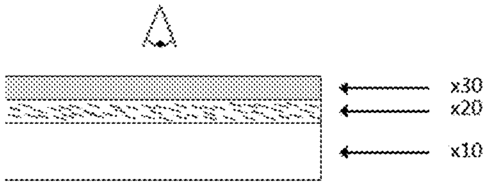
FIG. 1A-1E and FIG. 2A-2B schematically illustrate several embodiments of the present invention.

The following definitions are to be used to interpret the meaning of the terms discussed in the description and recited in the claims.

As used herein, the article "a" indicates one as well as more than one and does not necessarily limit its referent noun to the singular.

As used herein, the term "at least one" is meant to define one or more than one, for example one or two or three.

As used herein, the terms "about" and "substantially" mean that the amount or value in question may be the specific value designated or some other value in its neighborhood. Generally, the terms "about" and "substantially" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The terms "substantially parallel" refer to deviating not more than 2° as averaged on a coating layer surface of at least 1 $mm^2$, or on at least about 100 particles from parallel alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A. However, the term "comprising" also covers, as a particular embodiment thereof, the more restrictive meanings of "consisting essentially of" and "consisting of", so that for instance "a mixture comprising A, B and optionally C" may also (essentially) consist of A and B, or (essentially) consist of A, B and C.

The term "visible spectrum range" refers to the range from 400 nm to 700 nm.

The term "coating composition" refers to any composition which is capable of forming layer on a solid substrate and which can be applied preferably but not exclusively by a printing method. The coating composition comprises the platelet-shaped magnetic or magnetizable pigment particles described herein and the binder described herein.

As used herein, the term "wet" refers to a coating layer which is not yet at least partially cured, for example a coating in which the platelet-shaped magnetic or magnetizable pigment particles are still able to change their positions and orientations under the influence of external forces acting upon them.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The overt security feature described herein comprises the substrate (x10) described herein, the color constant layer (x20) comprising the magnetically oriented platelet-shaped magnetic or magnetizable pigment particles described herein and the optically variable layer (x30) comprising the cholesteric liquid crystal polymer (CLCP) selectively reflecting light in the visible spectrum range described herein.

The color constant layer (x20) denotes a coating layer that comprises magnetically oriented platelet-shaped magnetic or magnetizable pigment particles, wherein said particles are oriented by a magnetic field and wherein the oriented particles are fixed/frozen in their orientation and position (i.e. after curing) so as to form a magnetically induced layer.

Figure 7:
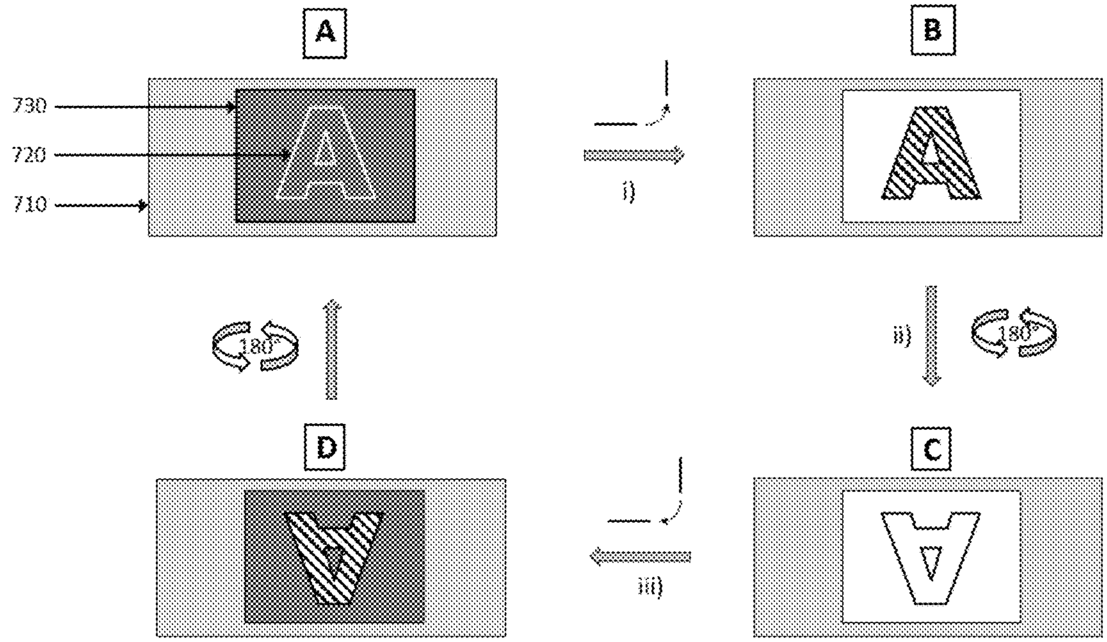
FIG. 7 illustrates top views of an overt security feature of the present invention comprising a substrate (710) and wherein the optically variable layer (730) is partially on top of the color constant layer (720) and a method to authenticate said feature by varying the viewing/observation angles β.

The optically variable layer (x30) is on top of the color constant layer (x20) in a first area made of a superposition of the optically variable layer (x30) and the color constant layer (x20). Alternatively, the overt security feature described herein may further comprise a second area solely made of the optically variable layer (x30), wherein said second area preferably surrounds the first area described herein when observed through the optically variable layer (x20). FIG. 7 illustrates an example of an overt security feature comprising the first area consisting of the indicium "A" and the second area consisting of the area surrounding the "A" indicium.

The eye-catching overt security feature described herein allows an observer to easily and conveniently authenticate it since the first area of said overt security feature exhibits at least three different colors upon observation with the naked eye through the optically variable layer (x20) (as illustrated by an eye in the Figures) at different viewing/observation angles, wherein one of said angles is a grazing angle (for example 10°, 20°, 30°, etc.) and another one is a face angle (about 90°), provided that the overt security feature has to be disposed on a permanent light absorbing background when the substrate is transparent.

The colorshifting property of the overt security feature comprising cholesteric liquid crystal polymers is considered to be an easy-to-detect overt security feature for the public. Advantageously, any one is able to easily detect, recognize and/or discriminate said security feature or security documents or articles comprising said security feature from their possible counterfeits with the unaided human senses, e.g. such features may be visible and/or detectable while still being difficult to produce and/or to copy. Moreover, the property of reflecting a circularly polarized light of cholesteric liquid crystal polymers may be used as a semi-covert feature which is visible or detectable with the help of a light-polarizing filter. In other words, the property of reflecting a circularly polarized light of cholesteric liquid crystal polymers may be used as an authentication tool for the recognition of security features comprising cholesteric liquid crystal polymers or security documents, security articles, decorating articles comprising said security features.

The overt security feature described herein comprises the substrate (x10) of a material selected from the group consisting of transparent materials, light absorbing materials and combinations thereof.

Preferred substrates made of one or more transparent materials include without limitation transparent polyolefins such as polyethylene (PE) and polypropylene (PP) including biaxially oriented polypropylene (BOPP), transparent polyamides, transparent polyesters such as poly(ethylene terephthalate) (PET), poly(1,4-butylene terephthalate) (PBT), poly(ethylene 2,6-naphthoate) (PEN) and transparent polyvinylchlorides (PVC), more preferably transparent polyesters such as PET.

"Light absorbing substrates" refers to substrates that absorb at least 50%, preferably at least 60% of the intensity of one or more portions of the visible part of the electromagnetic spectrum (visible spectrum). Said light absorbing substrates may be a continuous layer or may be a discontinuous layer in the form of an indicium or a pattern. Preferably, the light absorbing substrate is a dark substrate, more preferably a black substrate. Should the substrate described herein be a light absorbing substrate, no further additional layer or coating is required to easily observe without any machine or device the colorshifting properties of the overt security feature. Should the substrate not be a light absorbing substrate, an additional light absorbing background (x40), preferably a dark background (x40) and more preferably a black background (x40) may be present, wherein said dark background (x40) may be present permanently or non-permanently.

Preferred substrates made of one or more light absorbing materials include without limitation those selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents.

Light absorbing substrates may consist of transparent substrates comprising a layer (for example a printer layer) made of one or more light absorbing materials.

Should the substrate (x10) be made of one or more transparent materials, the overt colorshifting properties of the overt security feature are observed by disposing it on a non-permanent light absorbing background as described herein.

It is pointed out that these substrate materials are given exclusively for exemplifying purposes, without restricting the scope of the invention. In general, any substrate (which may not necessarily be flat and may be uneven) whose surface is not soluble, or only slightly soluble, in solvent(s) used in the cholesteric liquid crystal polymer precursor composition is a suitable substrate for the purposes of the present invention.

Figure 1B:
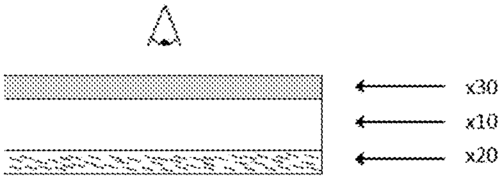

According to one embodiment shown in FIGS. 1A and 1B, the overt security feature described herein comprises a transparent substrate (x10), wherein the color constant layer (x20) and the optically variable layer (x30) are either placed on the same side of said transparent substrate (x10) (see FIG. 1A) or are placed on opposite sides (see FIG. 1B). As described herein, a non-permanent light absorbing background may be used to observe the colorshifting properties of the security feature by placing said non-permanent light absorbing background on the opposite side of the optically variable layer (x30).

Figure 1C:
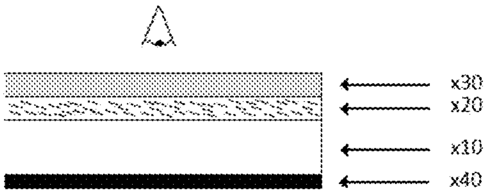
Figure 1D:
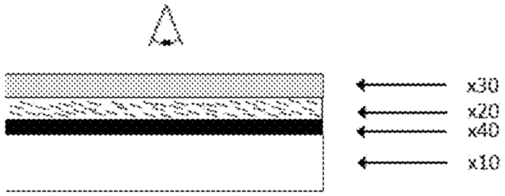
Figure 1E:
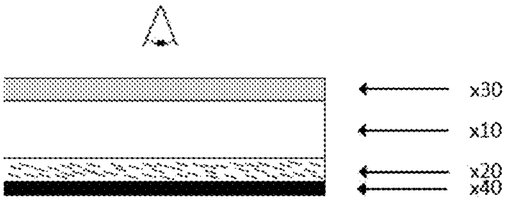

According to another embodiment shown in FIGS. 1C, 1D and 1E, the overt security feature described herein comprises a transparent substrate (x10) and a permanent light absorbing background (x40), wherein the color constant layer (x20) and the optically variable layer (x30) are either placed on the same side of said transparent substrate (x10) (see FIGS. 1C and 1D) or are placed on opposite sides (see FIG. 1E).

Figure 2A:
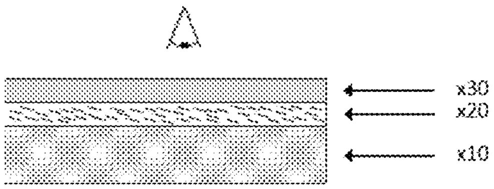

According to another embodiment shown in FIG. 2A, the overt security feature described herein comprises a light absorbing substrate (x10), wherein the color constant layer (x20) and the optically variable layer (x30) are placed on the same side of said light absorbing substrate (x10).

Figure 2B:
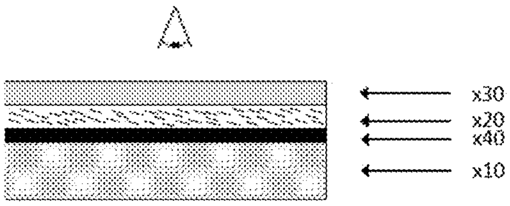

According to another embodiment shown in FIG. 2B, the overt security feature described herein comprises a light absorbing substrate (x10) and a permanent light absorbing background (x40), wherein the color constant layer (x20) and the optically variable layer (x30) are placed on the same side of said light absorbing substrate (x10).

The optically variable layer (x30) is on top of the color constant layer (x20) thus forming the first area described herein. According to one embodiment, the optically variable layer (x30) is partially on top of the color constant layer (x20) and comprises two areas: the first area wherein the optically variable layer (x30) is on top of the color constant layer (x20) (superposition of the two layers) and the second area solely made of the optically variable layer (x30). By "on top of", it is not limited to a direct contact; for example and as shown in FIG. 1B, the optically variable layer (x30) is at least partially on top of the color constant layer (x20) but is not in direct contact since the substrate (x10) is present between said two layers (x20 and x30).

According to one embodiment shown for example in FIGS. 1A, 1C, 1D, 2A and 2B, the optically variable layer (x30) is at least partially in direct contact with the color constant layer (x20) and both layers are placed on the same side of the substrate (x10). According to another embodiment shown for example in FIGS. 1B and 1E, the optically variable layer (x30) is not at least partially in direct contact with the color constant layer (x20) and both layers are placed on the opposite sides of the substrate (x10).

The optically variable layer (x30) and the color constant layer (x20) may independently be continuous layers or discontinuous layers. The color constant layer (x20) and/or the optically variable layer (x30) may independently be in the form of one or more indicia, wherein said indicia made of the color constant layer (x20) and the indicia made of the optically variable layer (x30) may have the same shape or have a different shape. As used herein, the term "indicium"/"indicia" shall mean continuous and discontinuous layers consisting of distinguishing markings or signs or patterns. Examples of indicia include codes, encoded marks (e.g. encoded alphanumeric data, a one-dimensional barcode, a two-dimensional barcode, a QR-code, datamatrix and IR-reading codes), symbols, alphanumeric symbols, motifs, geometric patterns (e.g. circles, triangles and regular or irregular polygons), letters, words, numbers, logos, drawings, portraits and combinations thereof.

The overt security feature described herein comprises the color constant layer (x20), wherein platelet-shaped magnetic or magnetizable pigment particles are oriented according to a specific orientation pattern.

The thickness of the color constant layer (x20) described herein is preferably between about 5 μm and about 30 μm, preferably between about 5 μm and about 20 μm and more preferably between about 5 μm and about 15 μm (as measured by using an Extramess Inductive Digital Comparator 2001 (supplied by Mahr).

As mentioned herein, the methods described herein for producing the overt security feature comprise the step c) of at least partially curing the layer comprising the radiation curable coating composition with the particles to a second state, where the platelet-shaped magnetic or magnetizable pigment particles are fixed in their current positions and orientations and can no longer move nor rotate within said layer. According to one embodiment, said step c) is carried out by exposing said layer to one or more wavelengths of between about 365 nm and about 470 nm, preferably from about 365 nm and about 405 nm, with a UV-Vis light-emitting-diode (LED) curing unit.

As used herein, by "at least partially curing the layer", it means that the platelet-shaped magnetic or magnetizable pigment particles are fixed/frozen in their adopted positions and orientations and cannot move and rotate anymore (also referred in the art as "pinning" of the particles).

As mentioned therein, the color constant layer comprise the magnetically oriented platelet-shaped magnetic or magnetizable pigment particles in the at least partially cured layer. Preferably, the platelet-shaped magnetic or magnetizable pigment particles described herein are present in an amount from about 2 wt-% to about 25 wt-%, preferably about 3 wt-% to about 20 wt-%, more preferably from about 4 wt-% to about 15 wt-% and still more preferably from about 4 wt-% to about 10 wt-%, the weight percentages being based on the total weight of the at least partially cured color constant layer. Preferably, the platelet-shaped magnetic or magnetizable pigment particles described herein are present in an amount from about 2 wt-% to about 25 wt-%, preferably about 3 wt-% to about 20 wt-%, more preferably from about 4 wt-% to about 15 wt-% and still more preferably from about 4 wt-% to about 10 wt-%, the weight percentages being based on the total weight of the radiation curable coating layer described herein.

Figure 3A:
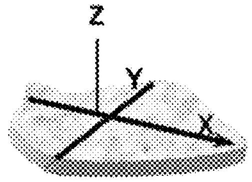
FIG. 3A schematically illustrates a platelet-shaped magnetic or magnetizable pigment particle with its main axis X and its main axis Y.

Platelet-shaped magnetic or magnetizable pigment particles described herein are defined as having, due to their non-spherical shape, non-isotropic reflectivity with respect to an incident electromagnetic radiation for which the cured binder material is at least partially transparent. The binder material is at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the non-spherical magnetic or magnetizable pigment particles contained in the binder material in its hardened or solid state and their orientation-dependent reflectivity can be perceived through the binder material at some wavelengths within this range. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the hardened binder material (not including the platelet-shaped magnetic or magnetizable pigment particles) in accordance with well-established test methods, e.g. DIN 5036-3 (1979-11). As used herein, the term "non-isotropic reflectivity" denotes that the proportion of incident radiation from a first angle that is reflected by a particle into a certain (viewing/observation) direction (a second angle) is a function of the orientation of the particles, i.e. that a change of the orientation of the particle with respect to the first angle can lead to a different magnitude of the reflection to the viewing/observation direction. In contrast to needle-shaped pigment particles which can be considered as one-dimensional particles, platelet-shaped pigment particles have an X-axis and a Y-axis defining a plane of predominant extension of the particles (FIG. 3A). In other words, and as shown in FIG. 3A, platelet-shaped pigment particles may be considered to be two-dimensional particles due to the large aspect ratio of their dimensions, wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second main axis Y perpendicular to X which also lies within said pigment particles.

The color constant layer described herein comprise magnetically oriented platelet-shaped magnetic or magnetizable pigment particles in the at least partially cured layer described herein, wherein said platelet-shaped magnetic or magnetizable pigment particles have a specific orientation angle corresponding to the elevation angle $|\alpha|$ within the color constant layer (x20). The platelet-shaped magnetic or magnetizable pigment particles in the at least partially cured color constant layer (x20) are oriented as described herein with the elevation angle $|\alpha|$ described herein and shown in FIG. 4, wherein $|\alpha|$ represent the absolute value of $+\alpha$ and $-\alpha$. In other words and as shown in FIG. 4, the platelet-shaped magnetic or magnetizable pigment particles in the at least partially cured color constant layer (x20) have the same angle $+\alpha$ or have the same angle $-\alpha$.

The platelet-shaped magnetic or magnetizable pigment particles of the color constant layer (x20) have substantially the same elevation angle $|\alpha|$, said elevation angle $|\alpha|$ having a value between about 10° and about 45° (10°≤angle $|\alpha|$≤45°), preferably between about 15° and about 40° (15°≤angle $|\alpha|$≤40°); and more preferably between about 15° and about 35° (15°≤angle $|\alpha|$≤35°). As described herein, the elevation angles $|\alpha|$ provided herein consist of average values being obtained i) either with a conoscopic scatterometer as described hereafter, wherein said values were averaged over at least about 1000 platelet-shaped magnetic or magnetizable pigment particles or ii) with a microscope as described hereafter, wherein said values were averaged over at least 10, in particular between 10 and 20, platelet-shaped magnetic or magnetizable pigment particles.

Figure 4:
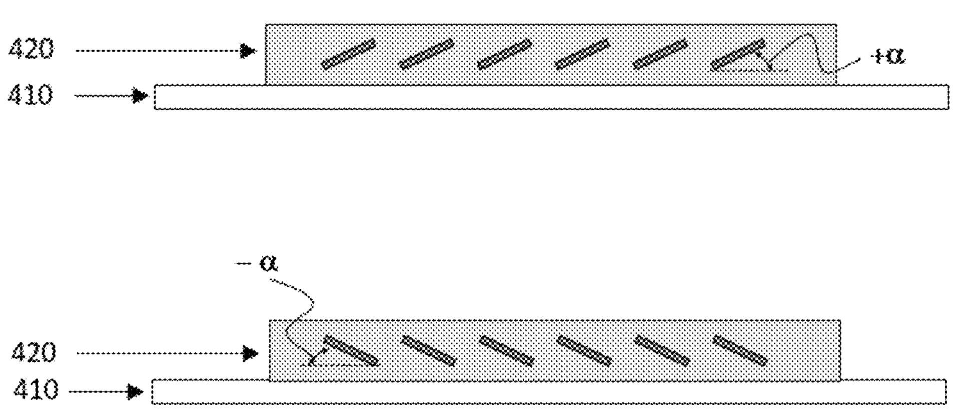
FIG. 4 schematically illustrate cross-sections of a substrate (410) carrying a color constant layer (420) comprising magnetically oriented platelet-shaped magnetic or magnetizable pigment particles, wherein the platelet-shaped magnetic or magnetizable pigment particles have substantially the same elevation angle |α| (i.e. the absolute value of +α and −α is the same in the respective color constant layer (x20)).

As shown for example in FIG. 4, the platelet-shaped magnetic or magnetizable pigment particles are oriented as described above with the elevation angle $\alpha$ described herein. In other words, the elevation angle $\alpha$ is formed by the main axis X of the platelet-shaped magnetic or magnetizable pigment particles and the two-dimensional surface of the substrate (410), wherein said elevation angle |α| has a value described herein.

The orientation of the platelet-shaped magnetic or magnetizable pigment particles described herein is obtained during the step b) described herein, wherein said orientation is carried out so as to mono-axially or bi-axially orient said particles described herein. In contrast to a mono-axial orientation wherein particles are orientated in such a way that only their main axis is constrained by the magnetic field (FIG. 3B), carrying out a bi-axial orientation means that the particles are made to orientate in such a way that their two main axes X and Y are constrained (FIG. 3C). That is, each platelet-shaped magnetic or magnetizable pigment particle can be considered to have a major axis in the plane of the pigment particle and an orthogonal minor axis in the plane of the pigment particle. The axes Y and Y of the platelet-shaped magnetic or magnetizable pigment particles are each caused to orient according to the magnetic field. Effectively, this results in neighboring platelet-shaped magnetic pigment particles that are close to each other in space to be substantially parallel to each other. Put another way, a bi-axial orientation aligns the planes of the platelet-shaped magnetic or magnetizable pigment particles so that the planes of said pigment particles are oriented to be substantially parallel relative to the planes of neighboring (in all directions) platelet-shaped magnetic or magnetizable pigment particles.

Figure 3B:
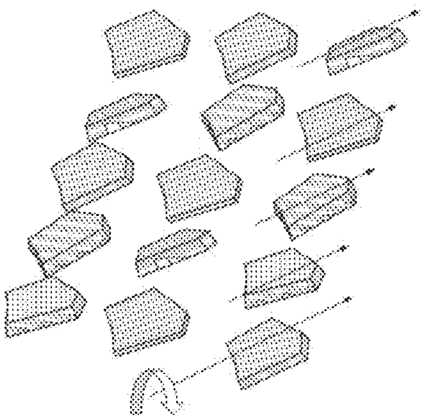
FIG. 3B schematically illustrate mono-axially oriented platelet-shaped particles, wherein the platelet vectors (vectors parallel to the main axis X of the particle) of neighboring platelet-shaped magnetic or magnetizable pigment particles are substantially parallel to each other.
Figure 3C:
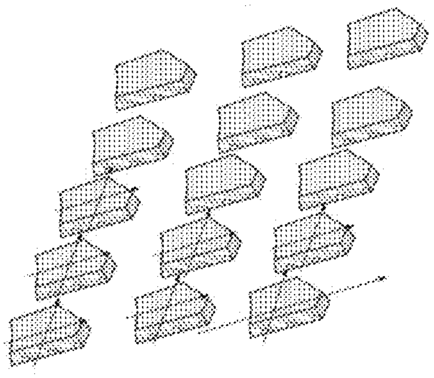
FIG. 3C schematically illustrate bi-axially oriented platelet-shaped particles, wherein the platelet vectors (vectors parallel to the main axis X of the particle) of neighboring platelet-shaped magnetic or magnetizable pigment particles are parallel to each other and the second platelet vectors (vectors parallel to the main axis Y of the particle) of neighboring platelet-shaped magnetic or magnetizable pigment particles are substantially parallel to each other.

For embodiments wherein the platelet-shaped magnetic or magnetizable pigment particles are mono-axially oriented as shown for example in FIG. 3B, the orientation of the platelet-shaped pigment particles is defined by the platelet vector which is the vector parallel to the main axis X of the particle, wherein the platelet vectors of neighboring platelet-shaped magnetic or magnetizable pigment particles are substantially parallel to each other, i.e. only the main axes X of neighboring platelet-shaped magnetic or magnetizable pigment particles are substantially parallel to each other (in other words, neighboring platelet-shaped magnetic or magnetizable pigment particles have a substantially same elevation angle α).

For embodiments wherein the platelet-shaped magnetic or magnetizable pigment particles are bi-axially oriented as shown for example in FIG. 3C, the orientation of the platelet-shaped pigment particles is defined by the platelet vector which is the vector parallel to the main axis X of the particle, wherein the platelet vectors of neighboring platelet-shaped magnetic or magnetizable pigment particles are parallel to each other and is further defined by a second platelet vector which is the vector parallel to the second axis Y of the particle, wherein the platelet vectors of neighboring platelet-shaped magnetic or magnetizable pigment particles are parallel to each other and the second platelet vectors of said neighboring platelet-shaped magnetic or magnetizable pigment particles are parallel to each other. For embodiments wherein the platelet-shaped magnetic or magnetizable pigment particles are bi-axially oriented as shown for example in FIG. 3C, the platelet vectors of neighboring platelet-shaped magnetic or magnetizable pigment particles are parallel to each other and not only the main axes X of neighboring platelet-shaped magnetic or magnetizable pigment particles are substantially parallel to each other but also the second axes Y of neighboring platelet-shaped magnetic or magnetizable pigment particles are substantially parallel to each other. For embodiments wherein the platelet-shaped magnetic or magnetizable pigment particles are bi-axially oriented as shown for example in FIG. 3C, the platelet-shaped magnetic or magnetizable particles are substantially parallel to each other.

According to one embodiment shown for example in FIGS. 1, 2, 4 and 5, the overt security feature described herein comprise the color constant layer (x20) with the magnetically oriented platelet-shaped magnetic or magnetizable pigment particles incorporated therein, wherein the platelet-shaped magnetic or magnetizable pigment particles have substantially the same elevation angle |α|.

Alternatively, the overt security feature described herein may comprise two or more zones comprising the platelet-shaped magnetic or magnetizable pigment particles, wherein the platelet-shaped magnetic or magnetizable pigment particles in the one zone have substantially the same elevation angle |α| (the platelet-shaped magnetic or magnetizable pigment particles in the at least partially cured color constant layer (x20) have the same angle +α or have the same angle −α) and the platelet-shaped magnetic or magnetizable pigment particles in a second zone have substantially the same additional elevation angle |α'| (the platelet-shaped magnetic or magnetizable pigment particles in the at least partially cured color constant layer (x20) have the same angle +α' or have the same angle −α'), said elevation angle |α| and said additional elevation angle |α'| being different from each other and/or being not coplanar. The two or more zones may consist of a single color constant layer (x20) or may consist of two or more independent color constant layers (x20, x20', etc.).

Suitable examples of platelet-shaped magnetic or magnetizable pigment particles described herein include without limitation color constant pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of platelet-shaped magnetic or magnetizable pigment particles described herein include without limitation color constant pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more compounds selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$); or layers B independently made from one or more compounds selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A/multilayer structures, B/A/B/M/B/A/B multilayer structures wherein the layers A, the magnetic layers M and the layers B are chosen from those described hereabove, preferably B/M/B multilayer structures and A/B/M/B/A multilayer structures, wherein A is a layer such as those described herein.

The platelet-shaped magnetic or magnetizable pigment particles described herein preferably exhibit a metallic color, more preferably a silver color.

The platelet-shaped magnetic or magnetizable pigment particles described herein preferably have a size d50 between about 2 μm and about 50 μm, preferably between about 5 μm and about 30 μm (as measured by direct optical granulometry).

The platelet-shaped magnetic or magnetizable pigment particles described herein may be surface treated so as to protect them against any deterioration that may occur in the radiation curable composition and layer and/or to facilitate their incorporation in said composition and layer, typically corrosion inhibitor materials and/or wetting agents may be used.

The methods described herein comprise steps for preparing the color constant layer (x20) described herein. Said method comprises the step a) of applying on the substrate (x10) surface described herein the radiation curable coating composition comprising the platelet-shaped magnetic or magnetizable particles described herein, said radiation curable coating composition being in a first, liquid state which allows its application as a layer and which is in a not yet at least partially cured (i.e. wet) state wherein the pigment particles can move and rotate within the layer. Since the radiation curable coating composition described herein is to be provided on the substrate (x10) surface, the radiation curable coating composition comprises at least a binder material and the magnetic or magnetizable pigment particles, wherein said composition is in a form that allows its processing on the desired printing or coating equipment. Preferably, said step a) is carried out by a printing process, more preferably selected from the group consisting of screen printing, rotogravure printing and flexography printing.

Depending on the printing process selected to produce the color constant layer (x20) and the optically variable layer (x30) of the overt security feature described herein, suitable viscosity values of the radiation curable coating composition comprising the platelet-shaped magnetic or magnetizable pigment particles are used: screen printing inks have a viscosity between about 50 mPa s and about 3000 mPa s at 25° C., flexography inks have a viscosity between about 50 mPa s and about 2000 mPa s at 25° C., rotogravure inks have a viscosity between about 50 mPa s and about 1000 mPa s at 25°, wherein the viscosity measurements for security inks having a viscosity value between 100 mPa s and 3000 mPa s are carried out with a Brookfield viscometer (model "RVDV-I Prime"), the spindle and rotation speed (rpm) being adapted according to the following viscosity ranges: spindle 21 at 100 rpm for viscosity values between 100 and 500 mPa s; spindle 27 at 100 rpm for viscosity values between 500 mPa s and 2500 mPa s; and spindle 27 at 50 rpm for viscosity values between 2500 mPa s and 3000 mPa s and wherein the viscosity measurements for security inks having a viscosity value between 10 mPa s and 100 mPa s are carried out either with a rotational viscosimeter DHR-2 from TA Instruments, having a cone-plane geometry and a diameter of 40 mm, at 25° C. and 1000 $s^{-1}$ or with a DIN 4" cup at 25° C.

The methods described herein further comprise the step b) of exposing the layer obtained at step a) to magnetic field lines of a magnetic-field generating device, wherein said magnetic field lines form an elevation angle |γ| with the substrate (x10) surface, said elevation angle |γ| having a value between about 10° and about 45° (10°≤|γ|≤45°), preferably between about 15° and about 40° (15°≤|γ|≤40°); and more preferably between about 15° and about 35° (15°≤|γ|≤35°), so as to orient the platelet-shaped magnetic or magnetizable pigment particles (for example by tiling the substrate (x10) carrying the layer comprising the particles in the magnetic field as shown in FIG. 5A1). The step b) described herein is carried out so as to mono-axially or bi-axially orient the platelet-shaped magnetic or magnetizable pigment particles described herein.

According to one embodiment, the step b) is carried out so as to mono-axially orient at least a part of the platelet-shaped magnetic or magnetizable pigment particles described herein. Suitable magnetic-field generating devices for mono-axially orienting the platelet-shaped magnetic or magnetizable pigment particles described herein are not limited.

Examples of suitable magnetic-field generating devices for mono-axially orienting the particles are disclosed in U.S. Pat. No. 7,047,883 and in the co-pending application PCT/EP2021/073863.

FIG. 5A-B of U.S. Pat. No. 7,047,883 discloses a magnetic-field generating device consisting of two spaced apart magnets 84 placed on a magnetic base 62 with their North poles facing the substrate. FIG. 9B of U.S. Pat. No. 7,047,883 discloses a magnetic-field generating device consisting a magnet 140 and the articles are placed with an offset position relatively the magnet axes. FIG. 9C of U.S. Pat. No. 7,047,883 discloses a magnetic-field generating device consisting of two magnets 142, and one magnet 142' having a diamond-shaped cross section, wherein the two magnets 142 have their North pole facing the substrate while the intervening magnet 142' has its South pole facing the substrate. FIG. 9D of U.S. Pat. No. 7,047,883 discloses a magnetic-field generating device consisting of two magnets 144, and one magnet 144' having roof-shaped, hexagonal, rounded, trapezoidal, or other cross-sections, wherein the two magnets 144 have their North pole facing the substrate while the intervening magnet 144' has its South pole facing the substrate. FIG. 9E of U.S. Pat. No. 7,047,883 discloses a magnetic-field generating device consisting of five magnets, the first magnet 142 being a diamond-shaped magnet with its North pole facing the substrate, the second magnet 146 being a rectangular magnet with its South pole facing the substrate, the third magnet 148 being a magnet with rounded top having its North pole facing the substrate, the fourth magnet 150 being a roof-shaped and having its South pole facing the substrate and the fifth magnet 152 being also a roof-shaped magnet and having its North pole facing the substrate.

FIG. 4A1 of the co-pending application PCT/EP2021/073863 discloses a magnetic-field generating device consisting of a bar dipole magnet and the particles are exposed to the magnetic field (magnetic field lines shown as lines with arrows pointing from the North Pole to the South Pole) of the magnetic field of the magnetic-field generating device herein in one or more areas (shown as a dotted rectangle A) wherein the magnetic field is substantially homogeneous and wherein the magnetic field lines are substantially parallel to each other in said one or more areas. FIG. 4A2 of the co-pending application PCT/EP2021/073863 discloses a magnetic-field generating device consisting of an assembly comprising two bar dipole magnets (M1, M2) having a same magnetic direction and an iron yoke (Y) and the particles are exposed to the magnetic field (magnetic field lines shown as lines with arrows pointing from the North Pole to the South Pole) of the magnetic field of the magnetic-field generating device in one or more areas (shown as a dotted rectangle A) wherein the magnetic field is substantially homogeneous and wherein the magnetic field lines are substantially parallel to each other in said one or more areas. FIG. 6A-B of the co-pending application PCT/EP2021/073863 discloses a magnetic-field generating device consisting of a rectangular assembly comprising two bar dipole magnets (M1, M2) and two pole pieces (P1, P2) and the particles are exposed to the magnetic field (magnetic field lines shown as lines with arrows pointing from the North Pole to the South Pole) of the magnetic-field generating device in one or more areas (shown as an dotted rectangle A) wherein the magnetic field is substantially homogeneous and wherein the magnetic field lines are substantially parallel to each other in said area.

According to one embodiment, the step b) is carried out so as to bi-axially orient the platelet-shaped magnetic or magnetizable pigment particles described herein. Suitable magnetic-field generating devices for bi-axially orienting the platelet-shaped magnetic or magnetizable pigment particles described herein are not limited.

Examples of suitable magnetic-field generating devices for mono-axially orienting the particles are disclosed in the co-pending application PCT/EP2021073983, WO 2018/019594 A1, WO 2016/083259 A1, WO 2021/239607 A1 and in co-pending application EP2178995.3.

Figure 6:
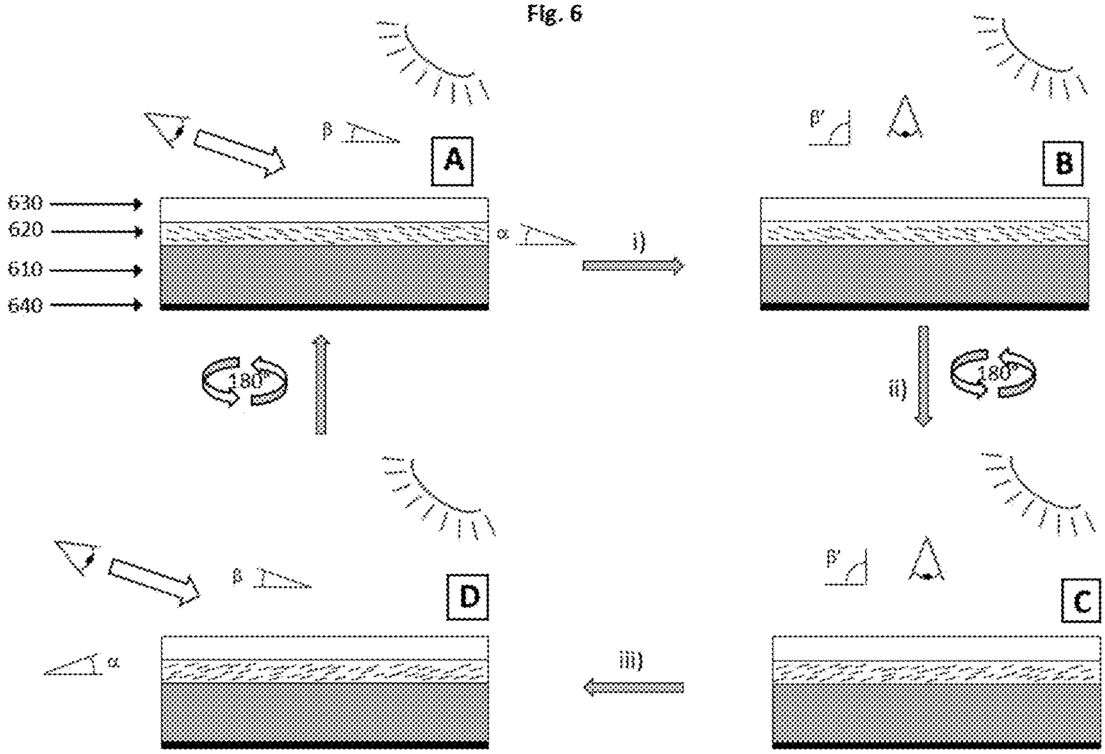
FIG. 6 illustrates cross-sections of an overt security feature of the present invention comprising a substrate (610) and optionally a light absorbing background (640) in case the substrate (610) is not made of one or more light absorbing materials, wherein the optically variable layer (630) is on top of the color constant layer (620) and a method to authenticate said feature by varying the viewing/observation angles β.

FIG. 4B1 of PCT/EP2021073983 (see also WO 2018/019594 A1) discloses a magnetic-field generating device consisting of a linear arrangement of at least four magnets (M1-M4) that are positioned in a staggered fashion or in zigzag formation and the particles are exposed to the magnetic field (magnetic field lines shown as lines with arrows pointing from the North Pole to the South Pole) of the magnetic-field generating device in one or more areas (shown as dotted rectangles A, A') wherein the magnetic field is substantially homogeneous and wherein the magnetic field lines are substantially parallel to each other in said one or more areas. EP 2 157 141 A1 discloses a similar suitable magnetic-field generating device in FIG. 5, wherein the magnetic-field generating device consists of a linear arrangement of at least three, preferably at least four, magnets that are positioned in a staggered fashion or in zigzag formation. FIG. 4B2 of PCT/EP2021073983 (see also WO 2018/019594 A1) discloses a magnetic-field generating device consisting of two dipole magnets (M1, M2) having an opposite magnetic direction and the particles are exposed to the magnetic field (magnetic field lines shown as lines with arrows pointing from the North Pole and the South Pole) of the magnetic fields of the magnetic-field generating device in one or more areas (shown as dotted rectangles A, A') wherein the magnetic field is substantially homogeneous and wherein the magnetic field lines are substantially parallel to each other in said one or more areas. FIG. 4B3 of PCT/EP2021073983 (see also WO 2018/019594 A1) discloses a magnetic-field generating device consisting of two dipole magnets (M1, M2) having a same magnetic direction. As shown in FIG. 4B3, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic-field generating device (430) in one or more areas (shown as a dotted rectangle A) wherein the magnetic field is substantially homogeneous and wherein the magnetic field lines are substantially parallel to each other in said one or more areas and wherein the substrate (420) carrying the coating layer (410) is provided in said one or more areas with the angle $\alpha$ described herein. FIG. 4B4 of PCT/EP2021073983 (see also WO 2018/019594 A1) discloses a magnetic-field generating device consisting of a Halbach array comprising five dipole magnets (M1-M5) and the particles are exposed to the magnetic field (magnetic field lines shown as lines with arrows pointing from the North Pole to the South Pole) of the magnetic-field generating device in one or more areas (shown as a dotted parallelepiped A) wherein the magnetic field is substantially homogeneous and wherein the magnetic field lines are substantially parallel to each other in said one or more areas. FIG. 4B5 of PCT/EP2021073983 (see also WO 2016/083259 A1) discloses a magnetic-field generating device consisting of a Halbach cylinder assembly comprising four structures, each one comprising a magnet bar (M1-M4) surrounded by a magnet-wire coil (not shown) and the particles are exposed to the magnetic field (magnetic field lines shown as lines with arrows pointing from the North Pole to the South Pole) of the magnetic-field generating device in one or more areas (shown as a dotted rectangle A) wherein the magnetic field is substantially homogeneous and wherein the magnetic field lines are substantially parallel to each other in said one or more areas. FIG. 4B6 of PCT/EP2021073983 (see also WO 2021/239607 A1) discloses a magnetic-field generating device consisting of an assembly of eight bar dipole magnets (M1-M8), said assembly comprising a first set comprising a first bar dipole magnet (M4) and two second bar dipole magnets (M1, M6), a second set comprising a first bar dipole magnet (M5) and two second bar dipole magnets (M3; M8) and a first pair of third bar dipole magnets (M2, M7) and the particles are exposed to the magnetic field (magnetic field lines shown as lines with arrows pointing from the North Pole to the South Pole) of the magnetic-field generating device in one or more areas (shown as a dotted rectangle A) wherein the magnetic field is substantially homogeneous and wherein the magnetic field lines are substantially parallel to each other in said one or more areas. FIG. 5A1-3 of PCT/EP2021073983 discloses a magnetic-field generating device consisting of an assembly comprising nine bar dipole magnets (M1-M5) with alternating North-South magnetic directions and arranged in a row and the particles are exposed to the magnetic field (magnetic field lines shown as lines with arrows pointing from the North Pole to the South Pole) of the magnetic-field generating device in one or more areas (shown as a dotted parallelepiped A) wherein the magnetic field is substantially homogeneous and wherein the magnetic field lines are substantially parallel to each other in said one or more areas.

The methods described herein further comprise the step c) of partially simultaneously with or subsequently to the step b), preferably partially simultaneously with the step b), a step of at least partially curing the layer with a curing unit so as to at least partially fix the position and orientation of the particles so that the particles have a same elevation angle $|\alpha|$ between about 10° and about 45° (10°≤angle $|\alpha|$≤45°), preferably between about 15° and about 40° (15°≤angle |α|≤40°); and more preferably between about 15° and about 35° (15°≤angle |α|≤35°), so as to form the color constant layer (x20) described herein. By "partially simultaneously", it is meant that both steps are partly performed simultaneously, i.e. the times of performing each of the steps partially overlap. In the context described herein, when curing is performed partially simultaneously with the orientation step b), it must be understood that curing becomes effective after the orientation so that the particles have the time to orient before the complete or partial curing of the color constant layer (x20). Should the step c) being carried out subsequently to the step b) described herein, the time between said steps is preferably between about 0.1 second and about 1.5 seconds, more preferably between about 0.1 seconds and 0.5 seconds.

According to one particularly preferred embodiment of the present invention, the radiation coating composition described herein is a UV-Vis-curable coating composition. UV-Vis curing advantageously allows very fast curing processes and hence drastically decreases the preparation time of the color constant layer (x20) described herein. Preferably, the UV-Vis-curable coating composition comprises one or more compounds selected from the group consisting of radically curable compounds and cationically curable compounds. The UV-Vis-curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis-curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodonium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis-curable coating compositions are preferably present in a total amount from about 0.1 wt-% to about 20 wt-%, more preferably about 1 wt-% to about 15 wt-%, the weight percents being based on the total weight of the UV-Vis-curable coating compositions.

According to one embodiment, the radiation curable composition described herein is a UV-Vis LED curable composition, i.e. a composition able to cure upon exposure to one or more wavelengths of between about 365 nm and about 470 nm, more preferably by exposure to UV light at 365 nm and/or 385 nm and/or 395 nm, emitted by a UV-LED light source. Should the UV-Vis LED curable composition only comprise radically curable monomers/oligomers, said composition typically comprises one or more radically curable photoinitiators absorbing in said wavelength ranges and/or one or more photoinitiators able to be activated by a photosensitizer. Preferably, the photoinitiators that absorb in said ranges are selected from the group consisting of phosphine oxides, phosphine oxide derivatives, thioxanthones and mixtures thereof. Should a photosensitizer be present, said photosensitizer is preferably selected from the group consisting of thioxanthones (which may act as a photoinitiator and as a photosensitizer, as known by the person in the art) as described hereabove and the one or more photoinitiators are preferably selected from the group consisting of phosphine oxides, phosphine oxide derivatives, alpha-aminoketones, benzophenones and mixtures thereof. When Norrish type II photoinitiators are used, such as thioxanthones and/or benzophenones, the radiation curable composition may additionally comprise amine-containing compounds such as Esacure A198 (IGM Resins, CAS 1793103-51-1), Speedcure 7040 (Lambson, CAS 1182751-31-0) or amine-modified polyether acrylates such as Ebecryl® 80 (Allnex, CAS 143748-77-0). When the UV-LED curable composition comprises cationically curable monomers (in part or in totality of the radiation curable monomers/oligomers), said composition preferably comprises one or more iodonium salts and one or more thioxanthones such as those described hereabove.

The radiation curable coating composition described herein may further comprise one or more marker substances or taggants and/or one or more machine readable materials provided that their presence does not meaningfully impact the observation of the colorshifting properties of the overt security feature described herein. Said materials may be selected from the group consisting of magnetic materials (different from the non-spherical magnetic or magnetisable pigment particles described herein), luminescent materials, electrically conductive materials, and infrared-absorbing materials. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment.

The radiation curable coating composition described herein may further comprise one or more additives provided that their presence does not meaningfully impact the observation of the colorshifting properties of the overt security feature described herein. Said additives include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The overt security feature described herein comprises the optically variable layer (x30) described herein.

According to one embodiment, the thickness of the optically variable layer (x30) described herein is between about 1 μm and about 10 μm, preferably between about 2 μm and about 8μ and more preferably between about 2 μm and about 6 μm (as measured by using an Extramess Inductive Digital Comparator 2001 (supplied by Mahr).

Preferably, the optically variable layer (x30) is obtained from a cholesteric liquid crystal polymer precursor composition comprising at least one nematic compound, at least one chiral dopant, at least one photoinitiator and one or more solvents.

The cholesteric liquid crystal precursor composition comprises (i) one or more nematic compounds A and (ii) one or more chiral dopant compounds B which are capable of giving rise to a cholesteric state of the cholesteric liquid crystal precursor composition upon heating. The pitch of the obtainable cholesteric state depends on the relative ratio of the nematic and the chiral dopant compounds. The (total) concentration of the one or more nematic compounds A in the cholesteric liquid crystal precursor composition for use in the present invention is about 4 to about 30, preferably about 4 to about 25, times the (total) concentration of the one or more chiral dopant compounds B. The one or more chiral dopant compounds B described hereabove are preferably present in an amount from about 0.1 wt-% to about 30 wt-%, more preferably from about 0.1 wt-% to about 20 wt-%, and still more preferably from about 3 wt-% to about 10 wt-%, the weight percents being based on the total weight of the cholesteric liquid crystal precursor composition. The one or more nematic compounds A described hereabove are preferably present in an amount from about 20 wt-% to about 50 wt-%, more preferably in an amount from about 30 wt-% to about 45 wt-%, the weight percents being based on the total weight of the cholesteric liquid crystal precursor composition.

Both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, an (preferably activated) unsaturated carbon-carbon bond such as for example an acrylate with formula $H_2C{=}CH{-}C(O){-}O$.

Nematic (precursor) compounds A which are suitable for use in the cholesteric liquid crystal precursor composition are known in the art, when used alone (i.e., without chiral dopant compounds) they arrange themselves in a state characterized by its birefringence. Non-limiting examples of nematic compounds A that are suitable for use in the present invention are described in, e.g., WO 93/22397 A1, WO 95/22586 A1, EP 0 847 432 B1, U.S. Pat. No. 6,589,445, US 2007/0224341. The entire disclosures of these documents are incorporated by reference herein.

A preferred class of nematic compounds A for use in the present invention comprises one or more polymerizable groups, identical or different from each other, per molecule. Examples of polymerizable groups include groups that are capable of taking part in a free radical polymerization, and in particular, groups comprising a carbon-carbon double or triple bond such as for example an acrylate moiety, a vinyl moiety or an acetylenic moiety. Particularly preferred as polymerizable groups are acrylate moieties.

The nematic compounds A for use in the present invention further may comprise one or more optionally substituted aromatic groups, preferably phenyl groups. Examples of the optional substituents of the aromatic groups include those which are set forth herein as examples of substituent groups on the phenyl rings of the chiral dopant compounds of formula (I) such as for example alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (vi) which are indicated below as examples for $A_1$ and $A_2$ in formula (I) (and formulae (IA) and (IB)), typically bonded to optionally substituted phenyl groups.

Non-limiting specific examples of nematic compounds which are suitable for use in the present invention include without limitation the following compounds: 2-methoxybenzene-1,4-diyl bis[4-({[4-(acryloyloxy)butoxy]carbonyl}oxy)benzoate]; 4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate; 2-methoxybenzene-1,4-diyl bis[4-({[4-(acryloyloxy)butoxy]carbonyl}oxy)-2-methyl-benzoate]; 2-methylbenzene-1,4-diyl bis[4-({[4-(acryloyloxy)butoxy]carbonyl}oxy)-2-methyl-benzoate]; 4-{[4-({[4-(acryloyloxy)butoxy]carbonyl}oxy)benzoyl]oxy}-2-methylphenyl 4-({[4-(acryloyloxy)butoxy]carbonyl}-oxy)-3-methoxybenzoate; 2-methylbenzene-1,4-diyl bis[4-({[4-(acryloyloxy)butoxy]-carbonyl}oxy)benzoate]; 2-methylbenzene-1,4-diyl bis[4-({[4-(acryloyloxy)butoxy]carbonyl}oxy)-3-methoxy-benzoate]; 4-{[4-({[4-(acryloyloxy)butoxy]carbonyl}oxy)-3-methoxybenzoyl]oxy}-2-methyl-phenyl 4-({[4-(acryloyloxy)butoxy]carbonyl}oxy)-3,5-dimethoxybenzoate; 2-methylbenzene-1,4-diyl bis[4-({[4-(acryloyloxy)butoxy]carbonyl}oxy)-3,5-dimethoxy-benzoate]; 2-methoxybenzene-1,4-diyl bis[4-({[4-(acryloyloxy)butoxy]carbonyl}oxy)-3,5-dimethoxybenzoate]; 4-{[4-({[4-(acryloyloxy)butoxy]carbonyl}oxy)-3-methoxybenzoyl]oxy}-2-methoxyphenyl 4-({[4-(acryloyloxy)-butoxy]carbonyl}oxy)-3,5-dimethoxybenzoate; 4-({4-[4-(acryloyloxy)butoxy]benzoyl}oxy)-3-methylphenyl 4-[4-(acryloyloxy)butoxy]-2-methylbenzoate; 4-({4-[4-(acryloyloxy)butoxy]benzoyl}oxy)-3-methylphenyl 4-[4-(acryloyloxy)butoxy]-3-methylbenzoate; 2-methylbenzene-1,4-diyl bis{4-[4-(acryloyloxy)butoxy]-2-methylbenzoate}; 4-({4-[4-(acryloyloxy)butoxy]-2-methylbenzoyl}oxy)-3-methylphenyl 4-[4-(acryloyl-oxy)butoxy]-2,5-dimethylbenzoate; 2-methylbenzene-1,4-diyl bis{4-[4-(acryloyloxy)butoxy]-2,5-dimethylbenzoate}2-methylbenzene-1,4-diyl bis{4-[4-(acryloyl-oxy)butoxy]benzoate}; 4-({4-[4-(acryloyloxy)butoxy]-3,5-dimethylbenzoyl}oxy)-3-methylphenyl 4-[4-(acryloyloxy)butoxy]-2,5-dimethylbenzoate; 2-methylbenzene-1,4-diyl bis{4-[4-(acryloyloxy)butoxy]-3,5-dimethylbenzoate}; 2-methoxybenzene-1,4-diyl bis{4-[4-(acryloyloxy)butoxy]-3,5-dimethylbenzoate}; 4-({4-[4-(acryloyloxy)butoxy]-3-methylbenzoyl}oxy)-2-methoxyphenyl 4-[4-(acryloyl-oxy)butoxy]-3,5-dimethylbenzoate; 2-methoxybenzene-1,4-diyl bis{4-[4-(acryloyloxy)butoxy]-3-methylbenzoate}; 4-({4-[4-(acryloyloxy)butoxy]benzoyl}oxy)-3-methoxyphenyl 4-[4-(acryloyloxy)-butoxy]-3-methylbenzoate; 4-({4-[4-(acryloyloxy)butoxy]benzoyl}oxy)-3-methoxyphenyl 4-[4-(acryloyloxy)-butoxy]-2,5-dimethylbenzoate; 2-methoxy-benzene-1,4-diyl bis{4-[4-(acryloyloxy)butoxy]-2-methoxybenzoate}; 2-methoxybenzene-1,4-diyl bis{4-[4-(acryloyloxy)butoxy]-3,5-dimethoxybenzoate}; 2-methoxybenzene- 1,4-diyl bis{4-[4-(acryloyloxy)butoxy]-3-methoxybenzoate}; 2-ethoxybenzene-1,4-diyl bis{4-[4-(acryloyloxy)butoxy]benzoate}; 2-ethoxybenzene-1,4-diyl bis{4-[4-(acryloyloxy)butoxy]-2-methylbenzoate}; 2-(propan-2-yloxy)benzene-1,4-diyl bis{4-[4-(acryloyloxy)butoxy]benzoate}; 4-({4-[4-(acryloyloxy)butoxy]benzoyl}oxy)-2-(propan-2-yloxy)phenyl 4-[4-(acryloyl-oxy)butoxy]-2-methylbenzoate; 2-(propan-2-yloxy)benzene-1,4-diyl bis{4-[4-(acryloyloxy)butoxy]-2-methylbenzoate}; 2-(propan-2-yloxy)benzene-1,4-diyl bis{4-[4-(acryloyloxy)butoxy]-2,5-dimethyl-benzoate}; 2-(propan-2-yloxy)benzene-1,4-diyl bis{4-[4-(acryloyloxy)butoxy]-3,5-dimethyl-benzoate}; and 2-(propan-2-yloxy)benzene-1,4-diyl bis{4-[4-(acryloyloxy)butoxy]-3,5-dimethoxy-benzoate}.

The one or more chiral dopant compounds B for use in the present invention preferably comprise at least one polymerizable group. Suitable examples of the one or more chiral dopant compounds B include those of formula (I):

(I)

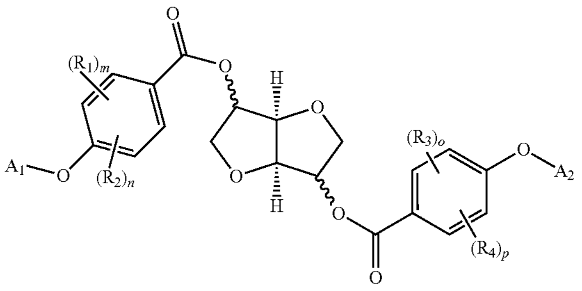

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (vi):

(i) $—[(CH_2)_y—O]_z—C(O)—CH═CH_2$;

(ii) $—C(O)-D_1-O—[(CH_2)_y—O]_z—C(O)—CH═CH_2$;

(iii) $—C(O)-D_2-O—[(CH_2)_y—O]_z—C(O)—CH═CH_2$;

(iv) $—[COO—(CH_2)_y—O]_z—C(O)—CH═CH_2$;

(v) $—C(O)-D_1-O—[COO—(CH_2)_y—O]_z—C(O)—CH═CH_2$;

(vi) $—C(O)-D_2-O—[COO—(CH_2)_y—O]_z—C(O)—CH═CH_2$;

$D_1$ denotes a group of formula

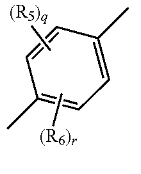

$D_2$ denotes a group of formula

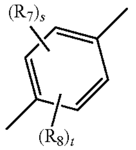

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment, the one or more chiral dopant compounds B may comprise one or more isomannide derivatives of formula (IA):

(IA)

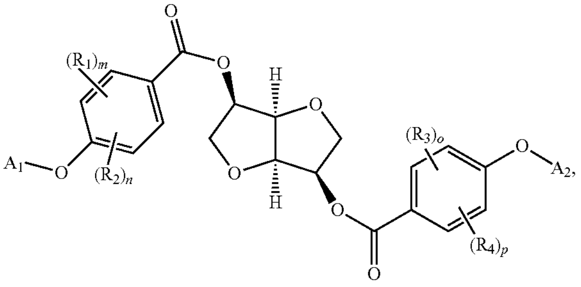

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (vi):

(i) $—[(CH_2)_y—O]_z—C(O)—CH═CH_2$;

(ii) $—C(O)-D_1-O—[(CH_2)y—O]_z—C(O)—CH═CH_2$;

(iii) $—C(O)-D_2-O—[(CH_2)y—O]_z—C(O)—CH═CH_2$;

(iv) $—[COO—(CH_2)_y—O]_z—C(O)—CH═CH_2$;

(v) $—C(O)-D_1-O—[COO—(CH_2)_y—O]_z—C(O)—CH═CH_2$;

(vi) $—C(O)-D_2-O—[COO—(CH_2)_y—O]_z—C(O)—CH═CH_2$;

$D_1$ denotes a group of formula

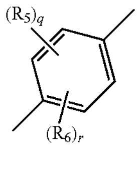

$D_2$ denotes a group of formula

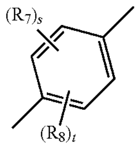

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one exemplary embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another exemplary embodiment of the compounds of formula (I) and of formula (IA), $A_1$ and $A_2$ each independently denote a group of formula $—[(CH_2)_y—O]_z—C(O)—CH{=}CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula $—[(CH_2)_y—O]_z—C(O)—CH{=}CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula $—C(O)\text{-}D_1\text{-}O—[(CH_2)_y—O]_z—C(O)—CH{=}CH_2$ and/or of formula $—C(O)\text{-}D_2\text{-}O—[(CH_2)_y—O]_z—C(O)—CH{=}CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula $—C(O)\text{-}D_1\text{-}O—[(CH_2)_y—O]_z—C(O)—CH{=}CH_2$ and/or a group of formula $—C(O)\text{-}D_2\text{-}O—[(CH_2)_y—O]_z—C(O)—CH{=}CH_2$; and $R_1$, $R_2$, $R_3$, $R_4$, $R_5$, $R_6$, $R_7$ and $R_8$ each independently denote $C_1$-$C_6$ alkoxy.

In another embodiment of the compounds of formula (IA) (and of formula (I)), $A_1$ and $A_2$ each independently denote a group of formula $—C(O)\text{-}D_1\text{-}O—[COO—(CH_2)_y—O]_z—C(O)—CH{=}CH_2$ and/or of formula $—C(O)\text{-}D_2\text{-}O—[COO—(CH_2)_y—O]_z—C(O)—CH{=}CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula $—C(O)\text{-}D_1\text{-}O—[COO—(CH_2)_y—O]_z—C(O)—CH{=}CH_2$ and/or of formula $—C(O)\text{-}D_2\text{-}O—[COO—(CH_2)_y—O]_z—C(O)—CH{=}CH_2$; and $R_1$, $R_2$, $R_3$, $R_4$, $R_5$, $R_6$, $R_7$ and $R_8$ each independently denote $C_1$-$C_6$ alkoxy.

In another embodiment, the one or more chiral dopant compounds B may comprise one or more isosorbide derivatives represented by formula (IB):

(IB)

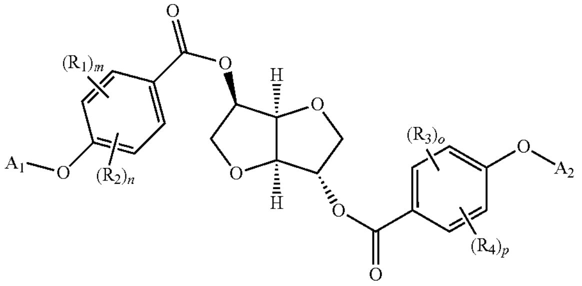

wherein:

- $R_1$, $R_2$, $R_3$, $R_4$, $R_5$, $R_6$, $R_7$ and $R_8$ each independently denote $C_1$-$C_6$ alkyl and $C_1$-$C_6$ alkoxy;
- $A_1$ and $A_2$ each independently denote a group of formula (i) to (vi):
- (i) $—[(CH_2)y—O]_z—C(O)—CH{=}CH_2$;
- (ii) $—C(O)\text{-}D_1\text{-}O—[(CH_2)y—O]_z—C(O)—CH{=}CH_2$;
- (iii) $—C(O)\text{-}D_2\text{-}O—[(CH_2)y—O]_z—C(O)—CH{=}CH_2$;
- (iv) $—[COO—(CH_2)_y—O]_z—C(O)—CH{=}CH_2$;
- (v) $—C(O)\text{-}D_1\text{-}O—[COO—(CH_2)_y—O]_z—C(O)—CH{=}CH_2$;
- (vi) $—C(O)\text{-}D_2\text{-}O—[COO—(CH_2)_y—O]_z—C(O)—CH{=}CH_2$;
- $D_1$ denotes a group of formula

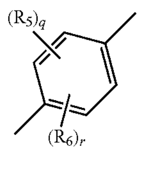

- $D_2$ denotes a group of formula

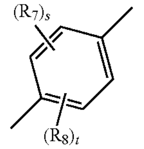

- m, n, o, p, q, r, s, and t each independently denote 0, 1, or 2;
- y denotes 0, 1, 2, 3, 4, 5, or 6;
- z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl; and m, n, o, and p each independently denote 0, 1, or 2. In an alternative embodiment, $R_1$, $R_2$, $R_3$, $R_4$, $R_5$, $R_6$, $R_7$ and $R_8$ in formula (IB) each independently denote $C_1$-$C_6$ alkoxy; and m, n, o, and p each independently denote 0, 1, or 2.

In another embodiment of the compounds of formula (IB), $A_1$ and $A_2$ each independently denote a group of formula $—[(CH_2)_y—O]_z—C(O)—CH{=}CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula $—[(CH_2)_y—O]_z—C(O)—CH{=}CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula $—C(O)\text{-}D_1\text{-}O—[(CH_2)_y—O]_z—C(O)—CH{=}CH_2$ and/or of formula $—C(O)\text{-}D_2\text{-}O—[(CH_2)_y—O]_z—C(O)—CH{=}CH_2$; $R_1$, $R_2$, $R_3$, $R_4$, $R_5$, $R_6$, $R_7$ and $R_8$ each independently denote $C_1$-$C_6$ alkyl; and m, n, o, and p each independently denote 0, 1, or 2. In an alternative embodiment, $A_1$ and $A_2$ in formula (IB) each independently denote a group of formula $—C(O)\text{-}D_1\text{-}O—[(CH_2)_y—O]_z—C(O)—CH{=}CH_2$ and/or a group of formula $—C(O)\text{-}D_2\text{-}O—[(CH_2)_y—O]_z—C(O)—CH{=}CH_2$; $R_1$, $R_2$, $R_3$, $R_4$, $R_5$, $R_6$, $R_7$ and $R_8$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula $—C(O)\text{-}D_1\text{-}O—[COO—(CH_2)_y—O]_z—C(O)—CH{=}CH_2$ and/or of formula $—C(O)\text{-}D_2\text{-}O—[COO—(CH_2)_y—O]_z—C(O)—CH{=}CH_2$; $R_1$, $R_2$, $R_3$, $R_4$, $R_5$, $R_6$, $R_7$ and $R_8$ each independently denote $C_1$-$C_6$ alkyl; and m, n, o, and p each independently denote 0, 1, or 2. In an alternative embodiment, $A_1$ and $A_2$ in formula (IB) each independently denote a group of formula —C(O)-$D_1$-O—[COO—$(CH_2)_y$—O]$_z$—C(O)—CH═$CH_2$ and/or a group of formula —C(O)-$D_2$-O—[COO—$(CH_2)_y$—O]$_z$—C(O)—CH═$CH_2$; $R_1$, $R_2$, $R_3$, $R_4$, $R_5$, $R_6$, $R_7$ and $R_8$ each independently denote $C_1$-$C_6$ alkoxy; and m, n, o, and p each independently denote 0, 1, or 2.

Non limiting examples of chiral dopant compounds B of formula (I) for use in the present invention include without limitation the following compounds: 2,5-bis-O-(4-{[4-(acryloyloxy)-3-methoxybenzoyl]oxy}-3-methoxybenzoyl)-1,4:3,6-dianhydro-D-mannitol; 2-O-(4-{[4-(acryloyloxy)-3-methoxybenzoyl]oxy}-3-methoxybenzoyl)-5-O-(4-{[4-(acryloyloxy)-3-methoxybenzoyl]oxy}-benzoyl)-1,4:3,6-dianhydro-D-mannitol; 2,5-bis-O-(4-{[4-(acryloyloxy)-benzoyl]oxy}-benzoyl)-1,4:3,6-dianhydro-D-mannitol; 2,5-bis-O-(4-{[4-(acryloyloxy)-butoxy]-benzoyl})-1,4:3,6-dianhydro-D-mannitol; 2,5-bis-O-[4-(acryloyloxy)-2-methylbenzoyl]-1,4:3,6-dianhydro-D-mannitol; 2,5-bis-O-(4-{[4-(acryloyloxy)-3-methoxybenzoyl]oxy}-benzoyl)-1,4:3,6-dianhydro-D-mannitol; 2,5-bis-O-(4-{[4-(acryloyloxy)-benzoyl]oxy}-3-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol; 2,5-bis-O-(4-{[4-(acryloyloxy)benzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)benzoyl]oxy}-2-methoxybenzoyl)-5-O-(4-{[4-(acryloyloxy)-2,5 -dimethylbenzoyl]oxy}-2-methoxybenzoyl)-1,4:3,6-dianhydro-D-mannitol; 2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol; 2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol; 2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol; 2,5-bis-O-(4-{[4-(acryloyloxy)benzoyl]oxy}-3-methoxybenzoyl)-1,4:3,6-dianhydro-D-mannitol; 2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol; 2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol; 2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol; 2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol; 2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol; 2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol; 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol; 2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol; 2,5-bis-O-(4-{[4-(acryloyloxy)-2,5-dimethylbenzoyl]oxy}-2-ethoxybenzoyl)-1,4:3,6-dianhydro-D-mannitol; 2,5-bis-O-(4-{[4-(acryloyloxy)-2-ethoxybenzoyl]oxy}-2-ethoxybenzoyl)-1,4:3,6-dianhydro-D-mannitol; 2,5-bis-O-(4-{[4-(acryloyloxy)-2-methoxybenzoyl]oxy}-2-ethoxybenzoyl)-1,4:3,6-dianhydro-D-mannitol; 2,5-bis-O-(4-{[4-(acryloyloxy)-2-ethoxybenzoyl]oxy}-2-methoxybenzoyl)-1,4:3,6-dianhydro-D-mannitol; 2,5-bis-O-(4-{[4-(acryloyloxy)-2-ethoxybenzoyl]oxy}-3-methylbenzoyl)-1,4:3,6-dianhydro-D-mannitol; 2,5-bis-O-(4-{[4-(acryloyloxy)-2-ethoxybenzoyl]oxy}-3-methoxybenzoyl)-1,4:3,6-dianhydro-D-mannitol; 2,5-bis-O-(4-{[4-(acryloyloxy)-3-methoxybenzoyl]oxy}-3-methoxybenzoyl)-1,4:3,6-dianhydro-D-glucitol; D-glucitol 1,4:3,6-dianhydro-bis[4-[[4-[[[4-[(1-oxo-2-propenyl)oxy]butoxy]carbonyl]oxy]benzoyl]oxy]benzoate]; 2,5-bis-O-(4-{[4-(acryloyloxy)-benzoyl]oxy}-3-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol; 2,5-bis-O-(4-{[4-(acryloyloxy)benzoyl]oxy}-2-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2-O-(4-{[4-(acryloyloxy)benzoyl]oxy}-2-methoxybenzoyl)-5-O-(4-{[4-(acryloyloxy)-2,5-dimethylbenzoyl]oxy}-2 -methoxybenzoyl)-1,4:3,6-dianhydro-D-glucitol; 2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol; 2,5-bis-O-(4-{[4-(acryloyloxy)benzoyl]oxy}-3-methoxybenzoyl)-1,4:3,6-dianhydro-D-glucitol; 2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol; 2-O-(4-{[4-(acryloyloxy)-2-methoxy-benzoyl]oxy}benzoyl)-5-O-(4-{[4-(acryloyloxy)-3-methoxybenzoyl]oxy}benzoyl)-1,4:3,6-dianhydro-D-glucitol; 2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol; 2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol; 2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol; 2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol; 2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol; 2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol; 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol; 2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol; 2,5-bis-O-(4-{[4-(acryloyloxy)-2,5-dimethylbenzoyl]oxy}-2-ethoxybenzoyl)-1,4:3,6-dianhydro-D-glucitol; 2,5-bis-O-(4-{[4-(acryloyloxy)-2-ethoxybenzoyl]oxy}-2-ethoxybenzoyl)-1,4:3,6-dianhydro-D-glucitol; 2,5-bis-O-(4-{[4-(acryloyloxy)-2-methoxybenzoyl]oxy}-2-ethoxybenzoyl)-1,4:3,6-dianhydro-D-glucitol; 2,5-bis-O-(4-{[4-(acryloyloxy)-2-ethoxybenzoyl]oxy}-2-methoxybenzoyl)-1,4:3,6-dianhydro-D-glucitol; 2,5-bis-O-(4-{[4-(acryloyloxy)-2-ethoxybenzoyl]oxy}-3-methylbenzoyl)-1,4:3,6-dianhydro-D-glucitol; 2,5-bis-O-(4-{[4-(acryloyloxy)-2-ethoxybenzoyl]oxy}-3-methoxybenzoyl)-1,4:3,6-dianhydro-D-glucitol; 2,5-bis-O-[4-(acryloyloxy)benzoyl]-1,4:3,6-dianhydro-D-glucitol; 2,5-bis-O-[4-(acryloyloxy)benzoyl]-1,4:3,6-dianhydro-D-mannitol; 2,5-bis-O-(4-{[4-({[4-(acryloyloxy)-butoxy]carbonyl}oxy)benzoyl]oxy}-benzoyl)-1,4:3,6-dianhydro-D-glucitol; 2,5-bis-O-(4-{[4-({[4-(acryloyloxy)-butoxy]carbonyl}oxy)-3-methoxybenzoyl]oxy}-benzoyl)-1,4:3,6-dianhydro-D-glucitol; 2,5-bis-O-(4-{[4-({[6-(acryloyloxy)-hexyloxy]carbonyl}-oxy)benzoyl]oxy}-benzoyl)-1,4:3,6-dianhydro-D-glucitol; and 2,5-bis-O-[4-({[4-(acryloyloxy)-butoxy]carbonyl}oxy)benzoyl]-1,4:3,6-dianhydro-D-glucitol.

The cholesteric liquid crystal precursor composition comprises one or more solvents. Suitable solvents are known to those skilled in the art and include without limitation low-viscosity, slightly polar and aprotic organic solvents, such as for example methyl ethyl ketone (MEK), acetone, cyclopentanone, cyclohexanone, ethyl acetate, ethyl 3-ethoxypropionate, and mixtures of two or more thereof. When present, the one or more solvents comprised in the cholesteric liquid crystal precursor composition are preferably present in an amount from about 30 wt-% to about 70 wt-%, more preferably from about 40 to about 60 wt-%, the weight percents being based on the total weight of the cholesteric liquid crystal precursor composition.

According to one embodiment, the cholesteric liquid crystal precursor composition described herein may further comprise one or more photoinitiators and said cholesteric liquid crystal precursor composition is hardened during step f) by UV-visible light radiation. Non-limiting examples of the many suitable photoinitiators for the cholesteric liquid crystal precursor composition described herein include α-hydroxyketones such as 1-hydroxy-cyclohexyl-phenyl-ketone and a mixture (e.g., about 1:1) of 1-hydroxy-cyclohexyl-phenyl-ketone and one or more of benzophenones, 2-hydroxy-2-methyl-1-phenyl-1-propanone, 2-hydroxy-1-[4-(2-hydroxyethoxy)phenyl]-2-methyl-1-propanone and 2-hydroxy-1-[4-[4-(1-hydroxy-2-methylpropanoyl)phenoxy]phenyl]-2-methylpropan-1-one (sold for example by IGM Resins under the name ESACURE KIP 160); phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-butan-1-one, 2-dimethylamino-2-(4-methyl-benzyl)-1-(4-morpholin-4-yl-phenyl)-butan-1-one and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl-bis(2,4,6-trimethylbenzoyl)-phosphine oxide and also thioxanthone derivatives such as those described herein. When present, the one or more photoinitiators comprised in the cholesteric liquid crystal precursor composition are preferably present in an amount from about 0.01 wt-% to about 10 wt-%, more preferably from about 0.05 wt-% to about 7 wt-%, the weight percents being based on the total weight of the cholesteric liquid crystal precursor composition.

The cholesteric liquid crystal precursor composition described herein may further comprise one or more additives, provided that said one or more additives do not negatively disturb or interfere with the formation of the helix and/or the formation of the polymer, said one or more additives including without limitation compounds and materials which are used for adjusting physical, rheological and chemical parameters of the composition such as the consistency (e.g. anti-settling agents and plasticizers), the foaming properties (e.g. antifoaming agents and deaerators), the lubricating properties (waxes), radiation sensitizers, UV stability (photostabilizers), adhesion properties, surface properties (wetting agents, oleophobing and hydrophobing agents), etc. Additives described herein may be present in one or more inks described herein in amounts and in forms known in the art, including in the form of so-called nano-materials where at least one of the dimensions of the additives is in the range of 1 to 1000 nm. When present, the one or more additives comprised in the cholesteric liquid crystal precursor composition are preferably present in an amount from about 0.01 wt-% to about 5 wt-%, the weight percents being based on the total weight of the cholesteric liquid crystal precursor composition.

The methods described herein comprise steps for preparing the optically variable layer (x30) described herein. Said method comprises the step d) of applying either on top of the color constant layer (x20) and/or on top of the substrate (x10) surface a cholesteric liquid crystal polymer precursor composition described herein so as to form a layer. Preferably, said step d) is carried out by a printing process preferably selected from the group consisting of screen printing, rotogravure printing and flexography printing, more preferably selected from the group consisting of flexography printing and rotogravure printing.

Should the overt security feature described herein comprises the second area solely made of the optically variable layer (x30) described herein, step d) consists of applying on top of the color constant layer (x20) and at least partially on top of the substrate (x10) surface the cholesteric liquid crystal polymer precursor composition described herein so as to form a layer.

Subsequently to the step d) of applying of the cholesteric liquid crystal precursor composition described herein so as to form the layer described herein, the method comprises the step e) of heating said composition. During said step e), the applied composition/the layer is heated so as to be brought to a cholesteric liquid crystal state having specific optical properties. The term "specific optical properties" is to be understood as a liquid crystal state with a specific pitch that selectively reflects a specific wavelength range (selective reflection band). To that end, the cholesteric liquid crystal precursor composition is heated, the one or more solvents contained in said composition are evaporated and the promotion of the desired cholesteric liquid crystal state takes place. The temperature used to evaporate the solvent and to promote the formation of the liquid crystal state depends on the components of the cholesteric liquid crystal precursor composition and is preferably from about 45° C. to about 150° C., more preferably from about 45° C. to about 120° C., and still more preferably from about 50° C. to about 115° C. Typically, the heating step described herein uses suitable heating sources including without limitation conventional heating means such as hot plates, ovens, streams of hot air and radiation sources. The required heating time depends on several factors such as for example the ingredients of the cholesteric liquid crystal precursor composition described herein, the type of heating device and the intensity of the heating (energy output of the heating device). Typically, the applied cholesteric liquid crystal precursor composition is heated for a period of time of about 1 second to about 45 seconds.

Subsequently to the step e) of heating described herein, the method comprises a step f) of hardening the layer obtained at step d) so as to form the optically variable layer (x30) described herein. Preferably, the hardening step f) is carried out by radiation including infra-red radiation, UV-visible light radiation, electron beam (E-beam) radiation, X-rays, gamma-rays and ultrasonic radiation. More preferably, the hardening step f) is carried out by UV-visible (UV/VIS) light radiation. UV-visible light radiation may be carried out in the presence of the one or more photoinitiators comprised in the cholesteric liquid crystal precursor composition described herein.

The overt security feature described herein may further comprise a discontinuous layer that changes the position of a selective reflection band of the optically variable layer, wherein said layer is arranged below the optically variable layer. The discontinuous layer described herein may be in the form of one or more indicia and may be made from a composition comprising one or more polymerizable monomers, each of them comprising one or more ether functionalities (—C—O—C—) per polymerizable group. WO 2015/067683 A1 discloses suitable resins including organic resins (such as polyacrylates, polymethacrylates, polyvinylethers, polyvinylesters, polyesters, polyethers, polyamides, polyurethanes, polycarbonates, polysulfones, phenolic resins, epoxy resins, and mixed forms of these resins), mixed inorganic/organic resins such as silicones (e.g., polyorganosiloxanes) and aqueous resins. Should said discontinuous layer that changes the position of a selective reflection band of the optically variable layer be present in the overt security feature described herein, said feature is prepared by applying and hardening/curing said discontinuous layer prior to the application of the cholesteric liquid crystal polymer precursor composition described herein.

Also described herein are security documents, security articles and decorative articles comprising one or more of the overt security features described herein.

Typical examples of decorative articles include without limitation luxury goods, cosmetic packaging, automotive parts, electronic/electrical appliances, furniture and fingernail articles. Alternatively, the overt security feature described herein may be comprised onto an auxiliary substrate such as for example a label and consequently transferred to a decorative article in a separate step.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evident labels and seals. It is pointed out that the disclosed substrates, security documents and decorative articles are given exclusively for exemplifying purposes, without restricting the scope of the invention.

Alternatively, the overt security feature described herein may be comprised onto an auxiliary substrate such as for example a security thread, security stripe, a foil, a decal, a window or a label and consequently transferred to a security document or article in a separate step.

Also described herein are methods for manufacturing a security document, security article or decorative article, as well as security documents, security articles and decorative articles obtained thereof, said methods comprising a) providing a security document, a security article or a decorative article, and b) providing one or more of the overt security features such as those described herein so that it is comprised on or by the security document, security article or decorative article. For example, said methods comprising the steps of providing the security document, security article or decorative article comprising a substrate such as those described herein; applying on the substrate (x10) surface of the security document, security article or decorative article the radiation curable coating composition comprising the platelet-shaped magnetic or magnetizable pigment particles described herein so as to form a layer; exposing the layer to the magnetic field lines of the magnetic-field generating device so as to orient the platelet-shaped magnetic or magnetizable pigment particles such as described herein; partially simultaneously with or subsequently to the orientation step, at least partially curing the layer with the curing unit so as to at least partially fix the position and orientation of the platelet-shaped magnetic or magnetizable pigment particles so that the platelet-shaped magnetic or magnetizable pigment particles have a same elevation angle $|\alpha|$ having a value such as described herein, so as to form the color constant layer (x20) as described herein; applying the cholesteric liquid crystal polymer precursor composition such as described herein; heating the layer such as described herein; and hardening the layer so as to obtain the optically variable layer (x30) such as described herein.

The substrate (x10) described herein may further comprise additional security elements, such as organic and/or inorganic pigments, dyes, flakes, optically variable elements, magnetic pigments, etc.

With the aim of increasing the durability through soiling or chemical resistance and cleanliness and thus the circulation lifetime of the overt security feature described herein, orwith the aim of modifying its aesthetical appearance (e.g. optical gloss), one or more protective layers may be applied on top of optically variable layer (x30). When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the overt security feature.

The overt security feature described herein may be provided directly on the substrate (x10) on which it shall remain permanently. Alternatively, the overt security feature may also be provided on a temporary substrate for production purposes, from which the overt security feature are subsequently removed.

Alternatively, one or more adhesive layers may be present, said one or more adhesive layers being on the side of the overt security feature opposite to the side of the optically variable layer (x30). Therefore, one or more adhesive layers may be applied, said one or more adhesive layers being applied after the hardening step f) has been completed. Such an object may be attached to all kinds of documents or other articles or items without printing or other processes involving machinery and rather high effort. Alternatively, the overt security feature described herein may be in the form of a transfer foil, which can be applied to a document or to an article in a separate transfer step. For this purpose, the overt security feature is provided with a release coating.

Thanks to the combination of the optically variable layer (x30) described herein and the color constant layer (x20) with the specific orientation pattern of the magnetically oriented platelet-shaped magnetic or magnetizable pigment particles described herein, the overt security feature described herein allows the man in the street to easily and conveniently authenticate it with the naked eye without requiring any device by tilting said feature and observing that the first area made of the superposition of the optically variable layer (x30) and the color constant layer (x20) described herein exhibits at least three different colors at different viewing/observation angles when said feature is observed through the optically variable layer (x30)), provided that the overt security feature has to be disposed on permanent light absorbing background when the substrate is transparent.

At least one viewing/observation angle, preferably two viewing/observation angles, is/are grazing angles and are required to allow an easy and convenient authentication. FIGS. 6 and 7 illustrate the different observation/viewing angles and how to tilt and rotate (see steps i) to iii)) the substrate (x10) carrying the optically variable layer (x30), the color constant layer (x20) and optionally the light absorbing background (x40) for authenticating the overt security feature described herein, wherein said feature is observed through the optically variable layer (x30) (as illustrated by an eye). FIG. 7 illustrates an overt security feature comprising the first area (see "A" indicium) and second area (area surrounding the "A" indicium) described herein wherein the shape of the color constant layer (720, a "A" letter) is different from the shape of the optically variable layer (730, a rectangle) to better illustrate the rotation of the feature that is carried out during step ii).

The authentication of the overt security feature described herein by its optical properties is conveniently done under common lighting conditions (i.e. everyday lighting including both non-directional light originating from light diffusion or multiple reflections and directional light coming from the sun or artificial light sources). Direct illumination (i.e. illumination coming from point light sources impinging the security feature at a given angle and being reflected at the same angle to the observer's eye) has to be best avoided since it generates specular reflection and renders the colors difficult/impossible to observe. The observation is preferably carried out according to four following situations (see for example FIG. 7):

situation A: the overt security feature is laid horizontally at arms' length and observed at a grazing angle $|\beta|$, said grazing angle $|\beta|$ approximately corresponding to the elevation angle $|\alpha|$ of the magnetically oriented platelet-shaped magnetic or magnetizable pigment particles in the color constant layer (x20). At this angle, the first area made of the superposition of the color constant layer (x20) and the optically variable layer (x30) ("A" in FIG. 7) of the overt security feature exhibits a first color (for example a blue color for the Examples E1-E4 described hereafter) and the second area solely made of the optically variable layer (x30) (area surrounding "A" in FIG. 7) exhibits the same color;

the man in the street then tilts the substrate (x10) carrying both layers (x20 and x30) so that the overt security feature is held vertically so as to face the observer's eyes (see step i) in FIG. 6-7);

situation B: the overt security feature is held vertically so as to face the observer's eyes and the observation angle $\beta'$ is now about 90°. At this angle, the first area exhibits a second color (for example a silver color for the examples E1-E4 described hereafter) and the second area exhibits a third color (for example a green color for the Examples E1-E4 described hereafter);

the man in the street then rotates the substrate (x10) carrying both layers (x20 and x30) and carries out a 180° rotation on an axis perpendicular to the substrate (x10), so that the overt security feature is held vertically so as to face the observer's eyes (see step ii) in FIG. 6-7) and the indicium "A" made of the color constant layer (x20) in FIG. 7 appears upside down due to the rotation, situation C: at this angle $\beta'$, the first area exhibits the third color (for example the green color for the Examples E1-E4 described hereafter) and the second area exhibits the same color;

the man in the street then tilts the substrate (x10) carrying both layers (x20 and x30) so that the overt security feature is held horizontally (see step iii) in FIG. 6-7), situation D: the overt security feature is held horizontally and again observed at the grazing angle $\beta$. At this angle, the first area exhibits the second color (for example the silver color for the Examples E1-E4 described hereafter) and the second area exhibits the first color (for example the blue color for the Examples E1-E4 described hereafter).

As described above, the man in the street is able to easily and conveniently authenticate the overt security feature by observing it at two different viewing/observation angles ($\beta$ and 90°) since at least three different colors (blue, silver, green color for the Examples E1-E4 described hereafter) can be observed for the first area made of the superposition of the optically variable layer (x30) and the color constant layer (x20) ("A" indicium in FIG. 6).

Alternatively, it is possible to start the visual observation from every situation and in every direction (i.e. clockwise or counterclockwise). However, the situation A described herein is particularly easy to observe since at the observation angle β (grazing angle) the color of the color constant layer (x20) is seen with the naked eye and in the absence of any device as being substantially the same as the color of the optically variable layer (x30) (i.e. there is a very limited influence of the magnetic pigment particles in the color constant layer (x20)).

EXAMPLES

The present invention is now described in more details with reference to non-limiting examples. Examples E1-E4 and C1-C2 have been carried out by using a coating composition comprising platelet-shaped magnetic or magnetizable pigment particles curable compositions provided in Table 1 and a cholesteric liquid crystal polymer precursor composition provided in Table 2

TABLE 1

| Ingredients | C1 E1-E3 | C2 E4 |
|---|---|---|
| HDDA (Allnex), hexamethylene diacrylate (CAS 13048-33-4) | 12.3 wt-% | |
| ACMO (RAHN), 4-(1-oxo-2-propenyl)-morpholine (CAS 5117-12-4) | 9.8 wt-% | |
| PETIA (Allnex), 2-propenoic acid, reaction products with pentaerythritol (CAS 1245638-61-2) | 8.2 wt-% | |
| Ebecryl ® 140 (Allnex), ditrimethylolpropane tetraacrylate (CAS 94108-97-1) | 6.6 wt-% | |
| Photocryl DP143 (Miwon), mixture of 77 wt-% amine modified acrylate (CAS not available, 15 wt-% glycerol propoxylate triacrylate (CAS 52408-84-1) and 8 wt-% trimethylolpropane triacrylate (CAS 15625-89-5) | 39.4 wt-% | |
| Esacure KIP 160 (IGM Resins), 1,1-(oxydi-4,1-phenylene)bis[2-hydroxy-2-methyl-1-propanone] (CAS 71868-15-0) | 7.6 wt-% | |
| Speedcure TPO-L (Lambson), ethyl (mesitylcarbonyl)phenylphosphinate (CAS 84434-11-7) | 8.1 wt-% | |
| Speedcure CPTX (Arkema), 1-chloro-2-propoxy-thioxanthone (CAS 142770-42-1) | 3.0 wt-% | |
| Magnetic pigment particles (VIAVI Solutions, Santa Rosa CA) | | |
| 5-layer platelet-shaped magnetic pigment particles exhibiting a metallic silver color having a flake shape of diameter $d_{50}$ about 20 μm and thickness about 1 μm | 5 wt-% | |
| 5-layer platelet-shaped magnetic pigment particles exhibiting a metallic silver color having a flake shape of diameter $d_{50}$ about 12 μm and thickness about 1 μm (*) | | 5 wt-% |
| viscosity(**) | 280 mPas | |

(*) pigment particles with a smaller d50 value have been chosen for Example E4 and Comparative Example C2 to ensure that the orientation of the particles was not constrained by the thickness of the ink layer (about 25 μm).
(**)the viscosity of the composition was measured at 25° C. on a Brookfield viscometer (model "DV-I Prime", spindle S21 at 100 rpm).

The coating composition comprising the magnetic particles was prepared by first mixing all ingredients described in Table 1 except the magnetic particles provided in Table 1 and dispersing them at room temperature using a Dispermat (model LC-2) for 20 minutes at 1500 rpm. The platelet-shaped magnetic pigment particles were then added and further dispersed at room temperature for 15 minutes at 1500 rpm so as to obtain 100 g of the coating composition. The coating composition comprising the magnetic particles of Table 1 had a viscosity that make it suitable for screen printing, rotogravure printing and flexography printing and thus the application method used therein mimicked a screen printing, a rotogravure printing and a flexography printing process.

TABLE 2

| Ingredients | |
|---|---|
| cyclohexanone (Brenntag), (CAS 108-94-1) | 58.78 wt-% |
| Lumogen S250 (BASF), (CAS 187585-64-4) 2-methylbenzene-1,4-diyl bis[4-({[4-(acryloyloxy)butoxy]carbonyl}oxy)benzoate] | 38.2 wt-% |
| Lumogen S750 (BASF) (CAS 223572-88-1) D-Glucitol 1,4:3,6-dianhydro-bis[4-[[4-[[[4-[(1-oxo-2-propenyl)oxy]butoxy]carbonyl]oxy]benzoyl]oxy]benzoate] | 1.8 wt-% |
| Esacure KIP 160 (IGM Resins), (CAS 71868-15-0) 1,1-(oxydi-4,1-phenylene)bis[2-hydroxy-2-methyl-1-propanone] | 1.2 wt-% |
| BYK 361N, polyacrylate-based surface additive (CAS not available) | 0.02 wt-% |
| viscosity(*) | 60 mPas s |

(*)the viscosity was measured at 25° C. using a DIN 4" cup, the values being converted to mPas using a viscosity conversion table provided by Saint Clair Systems (Washington, USA).

The cholesteric liquid crystal polymer precursor composition was prepared by pouring the solvent (cyclohexanone), the LC monomer (Lumogen S250) and the chiral dopant (Lumogen S750) in a 200 ml bottle and put in an ultrasonic bath for about 30 minutes at 40° C. in order to dissolve the ingredients in the solvent. The mixture was then poured in a Dispermat (model LC-2), the photoinitiator was added and dispersed during 20 minutes at 2000 rpm. Finally, the surfactant (BYK 361N) was added and mixed for 5 minutes at 1500 rpm.

The cholesteric liquid crystal polymer precursor composition of Table 2 had a viscosity that make it suitable for flexography printing and rotogravure printing and thus the application method used therein mimicked a flexography printing and rotogravure printing process.

Upon heating and curing the cholesteric liquid crystal polymer precursor composition of Table 2, a layer made thereof exhibited a blue to green colorshift upon tilting. In other words, the optically variable layer (x30) without the presence of the color constant layer (x20) exhibited a blue to green colorshift upon tilting and observation between a grazing angle and a face angle.

For each sample, the following method was used to prepare Examples E1-E4 and C1-C2:

a) the coating composition comprising the magnetic particles provided in Table 1 was applied on a piece of transparent PET substrate (Hostaphan, 20 cm×7.5 cm, thickness: 50 μm) (x10) so as to form a layer (dimensions 18 cm×4 cm), wherein said step was carried out with a semi-automatic laboratory coater (K101 Control Coater, RK Print), using a coating bar HC4 (nominal thickness 36 μm);

b) the layer (x10) obtained at step a) was exposed to the magnetic field of the magnetic-field generating device described hereafter so as to bi-axially orient the platelet-shaped magnetic or magnetizable pigment particles; as described herein and shown in FIG. 5A1, the substrate (x10) carrying the layer (x20) is tilted to an elevation angle γ with respect to the magnetic field lines;

subsequently to the step b), c) the layer obtained at step b) was at least partially cured so as to fix the position and orientation of the particles so that said particles have a same elevation angle γ between about 0° and about 50° provided in Table 3, thus forming the color constant layer (x20), wherein said layer was first cured while being in contact with the magnetic-field generating device upon exposure during about 2 seconds to a UV-LED lamp (Phoseon Firefly, 395 nm, 4 $W/cm^2$) placed at 1 cm of the layer and secondly cured while being removed from the magnetic-field generating device with a mercury UV drier (Technigraf Aktiprint Mini 18-2, two medium-pressure mercury lamp, total power 80 W/cm, one pass at a constant speed of 90 mm/s corresponding to an exposure time of about 0.5 sec); the so-obtained color constant layer (x20) had a thickness of about 25 μm;

d) the cholesteric liquid crystal polymer precursor composition of Table 2 was applied on the color constant layer (x20) using the same hand coater as described in step a) hereabove and a coating bar HCl (theoretical wet thickness 8 μm) so as to form a layer (dimensions 18 cm×4 cm);

e) the layer obtained at step d) was heated using a hot air drier at a temperature of 50° C. and for 30 seconds so as to evaporate the solvent and generate the cholesteric liquid crystal state; and f) the substrate (x10) carrying the color constant layer (x20) and the layer obtained at step e) was cured by moving said substrate (x10) under the same mercury UV drier as described hereabove for step d) with the same parameters so as to obtain the optically variable layer (x30; the so-obtained optically variable layer (x30) had a thickness of about 4 μm.

The 25 μm thickness of the color constant layer (x20) was chosen to ensure that, with the selected d50 values of the pigment particles (respectively 20 μm and 12 μm), the pigment particles orientation was not constrained thus allowing a comparison of the results. However, said value is not a preferred value for end-use applications.

The Examples E1-E4 and the Comparative Examples C1-C2 comprised a first area made of the superposition of the color constant layer (x20) and the optically variable layer (x30).

Magnetic-Field Generating Device (FIG. 5A1-A2)

The magnetic assembly shown in FIG. 5A1-A2 was used to bi-axially orient the pigment particles. The magnetic assembly comprised nine magnet sub-assemblies (M1-M9), wherein each magnet assembly being made of 18 identical magnets (NdFeB N45) having a height L4 (40 mm), a width L3 (10 mm) and a thickness L5 (3 mm) (see FIG. 5A2). Each assembly (M1-M9) was built by vertically stacking three groups of six magnets (i.e. each assembly (M1-M9) had a height L1=3×L4 (120 mm), a width L2=6×L5 (18 mm) and a thickness L3=10 mm). The magnetic axis of each identical magnet was parallel to its thickness (L5) and the magnets were put together in such a way that the magnetic axis of each assembly (M1-M9) was parallel to their width (L2) and perpendicular to the plane formed by the dimensions L1 and L3.

The magnet assemblies (M1-M9) were embedded in a non-magnetic holder (not shown) made of polyoxymethylene (POM) and disposed at fixed intervals L6 of 20 mm, their magnetic axis being perpendicular to the plane formed by the dimensions L1 (120 mm)×L7 (250 mm) of the magnetic field generating device and pointing alternatively towards opposite directions, as shown on FIG. 5A1. The generated magnetic field lines were substantially perpendicular to the plane L1×L7 of the magnetic field generating device thus producing a magnetic field that was substantially homogeneous as long as the substrate carrying the layer comprising the particles was moved at about half height of the magnetic field generating device.

The substrate carrying the not yet cured layer comprising the particles was placed on a rotatable holder comprising a polar coordinate ruler indicating the elevation angle γ between the magnetic field lines and the holder, then moved at half-height of the magnetic field generating device (L8=½L1) at an approximate speed of 10 cm/sec, the distance L9 between the plane L1×L7 of the magnetic field generating device and the closest edge of the layer comprising the particles being about 1 cm so as to biaxially orient the particles substantially parallel to each other and in the plane of the generated magnetic field lines. The elevation angle γ (provided in Table 3) was set by rotating the holder and precisely measuring the angle using the polar coordinate ruler.

The thickness of the color constant layer (x20) and the optically variable layer (x30) have been measured by using an Extramess Inductive Digital Comparator 2001 (supplied by Mahr).

TABLE 3

| | elevation angle γ with the magnetic field lines | elevation angle α of the particles measured by a conoscopic scatterometer | elevation angle α of the particles as measured using optical microscopy images |
|---|---|---|---|
| C1 | 0° | 3° ± 1.4 | 3° ± 2.5 |
| E1 | 10° | 8° ± 0.7 | 10° ± 3.1 |
| E2 | 20° | 17° ± 2 | 20° ± 3.3 |
| E3 | 30° | 27° ± 3 | 28° ± 2.9 |
| E4 | 40° | NA[a)] | 39° ± 4.1 |
| C2 | 50° | NA[a)] | 48° ± 5.4 |

[a)]the elevation angle value is too high to be measured by conoscopic scatterometer (total field of view is limited to 40° and the scatterometer does not allow to use 100% of the field).

The measured elevation angles α of the magnetic pigment particles in the color constant layer (x20) were independently obtained using a conoscopic scatterometer as described in FIG. 4A of WO 2019/038371 A1 (obtained from Eckhardt Optics LLC, 5430 Jefferson Ct, White Bear Lake, MN 55110; http://eckop.com). The elevation angles α of the platelet-shaped magnetic or magnetizable pigment particles in the color constant layer (x20) were measured directly after step d), on a layer surface of about 1 $mm^2$, i.e. the reported values corresponding to an average value over about one thousand particles. The measured elevation angles α provided in Table 3 are average value of about ten measurements at different locations of the color constant layer (x20).

Optical microscopy images have been obtained by using a binocular microscope (Olympus BX51, magnification ×100, lighting through the lens using an Olympus TH4-200 lighting equipment, camera: Nikon D7100) on a microtome slice of the samples (slice plane perpendicular to the substrate surface and the coating layer thickness, and perpendicular to the tilting axis). The substrates (x10) carrying the color constant layer (x20) were first independently embedded in an epoxy resin (Technicol 9461) that was left to dry for 24 hours at room temperature before cutting and polishing the microtome slice to produce samples with the following dimensions: 10 mm×10 mm×30 mm. The determination of the elevation angle α of the magnetic pigment particles was carried out using the software Adobe Illustrator CC (version 23.0.2). The values of elevation angles α reported in Table 3 were averaged on about 10 to 20 particles for each elevation angle.

The optical properties of the so-obtained Examples E1-E4 and C1-C2 have been evaluated with the naked eye and without any other device and are provided in Table 4 (FIGS. 6 and 7 illustrate how the observation was carried out). The Examples E1-E4 and C1-C2 were observed under commonly found lighting conditions as described hereabove, in particular a room lit by four rectangular neon lamps. A non-permanent black background (x40) (Leneta N2A-2, Leneta Company Inc. Mahwah, USA) was placed under the substrate (x10). The visual observation (illustrated by the eye in the Figures) was made through the optically variable layer (x30).

As explained hereabove, four situations A-D have been assessed and are shown as situations A-D in FIG. 6-7:

situation A: the observed security feature was held horizontally and the visual observation was made at a first observation angle β (grazing angle), said angle β approximately corresponding to the elevation angle α of the platelet-shaped magnetic or magnetizable pigment particles relative to the plane of the substrate (x10) in the color constant layer (x20);

situation B: the overt security feature was vertically tilted, so that it was now directly facing the observer's eyes, the visual observation was done at an observation angle β' of about 90° to the substrate surface (face angle);

situation C: the overt security feature was rotated by 180° while being maintained in the same vertical position, the rotation axis being perpendicular to the substrate (x10), wherein the observation angle β' was the same as in situation B (face angle); and situation D: the overt security feature was again laid horizontally and observed at angle β (grazing angle).

Alternatively, it is possible to start the visual observation from every situation and in every direction. However, situation A is particularly easy to observe since at grazing angle, the color of the first area approximately matches the color of the second area (i.e. there is a very limited contribution from the magnetic pigment particles in the color constant layer (x20)). Accordingly, it is therefore easier to start from situation A.

The observed colors of the first area made of the superposition of the color constant layer (x20) and the optically variable layer (x30) are reported for each situation in Table 4 for the Examples E1-E4 and the Comparative Examples C1-C2.

TABLE 4

| | C1 | E1 | E2 | E3 | E4 | C2 |
|---|---|---|---|---|---|---|
| elevation angle γ | 0° | 10° | 20° | 30° | 40° | 50 |
| situation A | | | | | | |
| viewing/observation angle β | grazing angle | | | | | |
| observed color | silver (pinkish) | dull blue | blue | blue | blue | blue |
| situation B | | | | | | |
| viewing/observation angle β' | face angle (about 90°) | | | | | |
| observed color | grey | silver (pinkish)[1] | silver (pinkish)[1] | silver (pinkish)[1] | silver (greenish) | green |
| situation C | | | | | | |
| viewing/observation angle β' | face angle (about 90°) | | | | | |
| observed color | grey | dull green | green | green | green | green |

TABLE 4-continued

| | C1 | E1 | E2 | E3 | E4 | C2 |
|---|---|---|---|---|---|---|
| Situation D | | | | | | |
| viewing/observation angle β | | | grazing angle | | | |
| observed color | silver (pinkish) | silver | silver | silver | silver | silver |

[1]The silver color in situation B for examples E1-E3 appeared slightly pinkish because of the reflection of the secondary color of the optically variable layer (x30).

The Comparative Example C1 failed to exhibit at least three different colors upon observation at different viewing/observation angles (when observed through the optically variable layer (x30) at different viewing/observation angles).

Whereas the Comparative Example C2 exhibited at least three different colors upon observation at different viewing/observation angles (when observed through the optically variable layer (x30) at different viewing/observation angles), the viewing/observation angle β (grazing angle) was too high thus rendering the feature not suitable for its easy and convenient authentication. Furthermore, the color at face angle (90°) in situation B was not the expected silver color (Examples E1-E4), but the green color observed in situation C.

Contrary to the Comparative Examples C1-C2, the Examples E1-E4 comprising a color constant layer where the platelet-shaped magnetic or magnetizable pigment particles have an elevation angle |α| between about 10° and about 45° (10°≤angle |α|≤45°), preferably between about 15° and about 40° (15°≤angle |α|≤40°); and more preferably between about 15° and about 35° (15°≤angle |α|≤35°) exhibited at least three different colors (blue, silver and green) when observed at two different observation/viewing angles, wherein the viewing/observation angles β (grazing angle) were small enough to allow an easy and convenient authentication of the overt security feature with the naked eye and in the absence of any device.

The Examples E1-E4 were also observed from the side of the color constant layer (x20) while the non-permanent black background (x40) described above was placed under the optically variable layer (x30)). Upon observation through the color constant layer (20) and at the same different viewing/observation angles provided in Table 4, only a single color (grey) was observed.

Similar examples E1'-E4' and Comparative Examples C1'-C2' have been prepared as described above, with the exception that the dimensions of the optically variable layer (x30) (dimensions 18 cm×6 cm) is larger than the dimension of the color constant layer (x20) (dimensions 18 cm×4 cm); thus forming a feature comprising a first area (dimensions: 18×4 cm) made of the superposition of the color constant layer (x20) and the optically variable layer (x30) and approximately centered in the length of the substrate (x10) and a second area comprising two zones of approximately 18×1 cm on each side of the first area. Upon visual observation of the examples as described above, the observed colors of the first area in the four situations A-D were the same as described in Table 4 and the observed colors of the second area were: blue for the situations A and D and green for the situations B and C. In the absence of the color constant layer (x20), the optically variable layer (x30) appeared green at face angles in the examples E1-E4 and comparative examples C1-C2, the secondary color being red.

The invention claimed is:

1. An overt security feature comprising:

a) a substrate made of a material selected from the group consisting of transparent materials, light absorbing materials and combinations thereof, b) a color constant layer comprising magnetically oriented platelet-shaped magnetic or magnetizable pigment particles, c) an optically variable layer comprising a cholesteric liquid crystal polymer selectively reflecting light in the visible spectrum range and being on top of the color constant layer thus forming a first area made of a superposition of the optically variable layer and the color constant layer, wherein the platelet-shaped magnetic or magnetizable pigment particles of the color constant layer have substantially a same elevation angle α, said elevation angle |α| having a value between about 10° and about 45° (10°≤angle |α|≤45°).

2. The overt security feature according to claim 1, wherein the cholesteric liquid crystal polymer of the optically variable layer is obtained from a cholesteric liquid crystal polymer precursor composition comprising one or more nematic compounds, one or more chiral dopants, one or more photoinitiators and one or more solvents.

3. The overt security feature according to claim 1, wherein the optically variable layer has a thickness between about 1 μm and about 10 μm.

4. The overt security feature according to claim 1, wherein the color constant layer is a layer obtained from a radiation curable coating composition comprising the platelet-shaped magnetic or magnetizable pigment particles, one or more radiation curable oligomers, one or more radiation curable monomers and one or more photoinitiators.

5. The overt security feature according to claim 1, wherein the platelet-shaped magnetic or magnetizable pigment particles exhibit a metallic color.

6. The overt security feature according to claim 5, wherein the platelet-shaped magnetic or magnetizable pigment particles exhibit a silver color.

7. The overt security feature according to claim 1, wherein the platelet-shaped magnetic or magnetizable pigment particles have a size d50 between about 2 μm and about 50 μm.

8. The overt security feature according to claim 1, wherein the platelet-shaped magnetic or magnetizable pigment particles are present in an amount from about 2 wt-% to about 25 wt-%, the weight percentages being based on the total weight of the color constant layer.

9. The overt security feature according to claim 1, wherein the color constant layer has a thickness between about 5 μm and about 30 μm.

10. The overt security feature according to claim 1, wherein the color constant layer is in the form of one or more indicia and/or the optically variable layer is in the form of one or more indicia, said one or more indicia being the same or being different.

11. The overt security feature according to claim 1, further comprising a second area solely made of the optically variable layer.

12. A security document, security article or decorative article comprising one or more overt security features recited in claim 1.

13. A method for producing the overt security feature recited in claim 1, said method comprising the steps of:

a) applying on the substrate surface a radiation curable coating composition comprising platelet-shaped magnetic or magnetizable pigment particles that exhibit a metallic color, said radiation curable coating composition being in a first, liquid state so as to form a layer;

b) exposing the layer obtained at step a) to magnetic field lines of a magnetic-field generating device, wherein said magnetic field lines form an elevation angle |γ| with the substrate surface, said elevation angle |γ| having a value between about 10° and about 45° so as to orient the platelet-shaped magnetic or magnetizable pigment particles;

c) partially simultaneously with or subsequently to the step b), a step of at least partially curing the layer with a curing unit so as to at least partially fix the position and orientation of the platelet-shaped magnetic or magnetizable pigment particles so that the platelet-shaped magnetic or magnetizable pigment particles have a same elevation angle α between about 10° and about 45° (10°≤angle |α|≤45°) so as to form the color constant layer, d) applying either at least partially on the color constant layer and/or at least partially on the substrate surface a cholesteric liquid crystal polymer precursor composition, e) heating the layer obtained at step d), and f) hardening the layer obtained at step e) so as to obtain the optically variable layer.

14. The method according to claim 13, wherein the step a) is carried out by a printing process selected from the group consisting of screen printing, rotogravure printing and flexography printing and wherein the step d) is carried out by a printing process selected from the group consisting of by flexography printing and gravure printing.

15. The method according to claim 13, wherein the step c) is carried out by exposing said layer to one or more wavelengths of between about 365 nm and about 405 nm emitted by a UV-Vis LED curing unit.

16. The overt security feature according to claim 1, wherein the elevation angle |α| has a value between about 15° and about 35° (15% ≤angle |α|≤35°.

17. The overt security feature according to claim 3, wherein the optically variable layer has a thickness between about 2 μm and about 6 μm.

18. The overt security feature according to claim 8, wherein the platelet-shaped magnetic or magnetizable pigment particles are present in an amount from about 4 wt-% to about 10 wt-%, the weight percentages being based on the total weight of the color constant layer.

19. The overt security feature according to claim 9, wherein the color constant layer has a thickness between about 5 μm and about 15 μm.

20. The method according to claim 13, wherein the platelet-shaped magnetic or magnetizable pigment particles have a same elevation angle α between about 15° and about 35° (15°≤angle |α|≤35°.

* * * * *